United States Patent
Streater et al.

(10) Patent No.: US 12,028,564 B2
(45) Date of Patent: *Jul. 2, 2024

(54) METHODS, SYSTEMS, PROCESSORS AND COMPUTER CODE FOR PROVIDING VIDEO CLIPS

(71) Applicant: BLACKBIRD PLC, London (GB)

(72) Inventors: Stephen Streater, London (GB); Nigel Touati-Evans, London (GB); Mark Burtenshaw-Snellgrove, London (GB); Brian Brunswick, London (GB); Andrew Slough, London (GB); Jeremy James, London (GB)

(73) Assignee: BLACKBIRD PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,149

(22) Filed: Feb. 13, 2023

(65) Prior Publication Data

US 2023/0188769 A1 Jun. 15, 2023

Related U.S. Application Data

(63) Continuation of application No. 17/367,906, filed on Jul. 6, 2021, now Pat. No. 11,582,497, which is a (Continued)

(30) Foreign Application Priority Data

Apr. 28, 2017 (GB) ...................... 1706848

(51) Int. Cl.
*H04N 21/262* (2011.01)
*H04N 21/2187* (2011.01)
(Continued)

(52) U.S. Cl.
CPC ..... *H04N 21/2387* (2013.01); *H04N 21/2187* (2013.01); *H04N 21/231* (2013.01);
(Continued)

(58) Field of Classification Search
CPC .......... H04N 21/2387; H04N 21/2187; H04N 21/231; H04N 21/237; H04N 21/26258;
(Continued)

(56) References Cited

U.S. PATENT DOCUMENTS 11,582,497 B2 * 2/2023 Streater ............ H04N 21/23439
2007/0239609 A1 10/2007 Fish et al.
(Continued)

*Primary Examiner* — John R Schnurr
(74) *Attorney, Agent, or Firm* — Saul Ewing LLP

(57) ABSTRACT

A computer-implemented method/system of providing video clip playback, including: (i) receiving a video feed; (ii) converting the video feed into a compressed format structure; (iii) uploading the compressed format structure to a first server; (iv) receiving an electronic edit decision list defining how to manipulate the compressed format structure; (v) saving the electronic edit decision list to a server; (vi) receiving a request to provide to a user terminal a video clip playback corresponding to a video clip defined by the compressed format structure and the electronic edit decision list; (vii) sending to the user code executable to provide the video clip defined by the compressed format structure and the electronic edit decision list, and (viii) responding to requests from the code when executed, to provide content corresponding to the compressed format structure stored, in accordance with the electronic edit decision list, to provide the decision list video clip playback.

34 Claims, 13 Drawing Sheets

Related U.S. Application Data continuation of application No. 16/608,344, filed as application No. PCT/GB2018/051154 on Apr. 30, 2018, now Pat. No. 11,057,657.

(51) Int. Cl.
| | |
|---|---|
| *H04N 21/231* | (2011.01) |
| *H04N 21/2343* | (2011.01) |
| *H04N 21/237* | (2011.01) |
| *H04N 21/2387* | (2011.01) |
| *H04N 21/81* | (2011.01) |
| *H04N 21/845* | (2011.01) |
| *H04N 21/8543* | (2011.01) |

(52) U.S. Cl.
CPC ..... *H04N 21/23439* (2013.01); *H04N 21/237* (2013.01); *H04N 21/26258* (2013.01); *H04N 21/8166* (2013.01); *H04N 21/8173* (2013.01); *H04N 21/8456* (2013.01); *H04N 21/8543* (2013.01)

(58) Field of Classification Search
CPC ........... H04N 21/8166; H04N 21/8173; H04N 21/8456; H04N 21/8543; H04N 21/854
See application file for complete search history.

(56) References Cited

U.S. PATENT DOCUMENTS

| | | |
|---|---|---|
| 2009/0037967 A1 | 2/2009 | Barkan et al. |
| 2013/0036201 A1 | 2/2013 | Mclaughlin |
| 2013/0212507 A1 | 8/2013 | Fedoseyeva et al. |
| 2016/0373546 A1 | 12/2016 | Lotfallah et al. |
| 2016/0381367 A1 | 12/2016 | Good |
| 2017/0359611 A1 | 12/2017 | Iguchi et al. |
| 2018/0041766 A1 | 2/2018 | Holland et al. |

* cited by examiner

Global context

Local transition

Cuts encoding

Delta encoding

METHODS, SYSTEMS, PROCESSORS AND COMPUTER CODE FOR PROVIDING VIDEO CLIPS

CROSS-REFERENCE TO RELATED APPLICATIONS

This application is a continuation of U.S. application Ser. No. 17/367,906, filed on Jul. 6, 2021, which is a continuation of U.S. application Ser. No. 16/608,344, filed on Oct. 25, 2019, which claims the priority of PCT/GB2018/051154, filed on Apr. 30, 2018, which claims priority to GB Application No. GB1706848.7, filed Apr. 28, 2017, the entire contents of each of which being fully incorporated herein by reference.

BACKGROUND OF THE INVENTION

1. Field of the Invention

The field of the invention relates to methods, systems, processors and computer code for providing video clips for playback.

2. Technical Background

Video is increasingly dominating the Internet. The majority of internet content, both on fixed line and on mobile, is now video content.

Live TV broadcasts have a high value, with sometimes millions of viewers sharing an enthralling experience at the same time. It used to be thought that internet would not be able to penetrate the Sports television experience: sports would be effectively reserved for broadcast television for the foreseeable future. But this prediction failed to allow for both the advances in internet technology, and the convenience of social networks as a route to viewers—and advertisers.

Readily available tools enable the creation of simple clips, with roughly hewn start and end points, from live video feeds. Now, viewers and advertisers are pushing for higher quality content, with several clips combined to tell a short story. For example, a video clip of a goal in football, or soccer, will have any tackles and other action leading up to the goal, the actual goal, and the celebration which follows. Views from different angles can be edited together, and low value sections can be cut down to increase the engagement the video provides.

A big issue for the rights holders is that members of the public can now live stream (currently at relatively low quality) live video of a TV broadcast straight to social media using a smartphone. Clips can then be shared quickly to mobile devices or internet devices—before the professionally edited highlights are available. This pirated content leaches viewers away from official websites and eats away at the revenue which can be generated from the paid-for digital rights. If it was possible to distribute high quality professionally edited content quickly to the rights holders' websites, the rights holders would increase the viewer figures on their websites, increasing the commercial value of the near-live content.

The transmission of "live" video feeds to websites makes such feeds publicly available. What is needed is a technical solution to the technical problem of providing high quality video clips more quickly to the public.

3. Discussion of Related Art

At present, the MPEG video standards are the typical standards used to generate video clips as quickly as possible, such as video clips of sporting events. Because of the delays caused in generating an MPEG compressed video file, and uploading it to a server for preparation for distribution, including generating other versions of the MPEG file at multiple resolutions suitable for the various viewing device screen sizes and transmission bandwidths to those devices (typically about ten such versions are created), in order to save some time, the human who edits the originally recorded video to generate video clips as quickly possible is often flown by commercial airline to be present at the live sporting event, so as to be able to edit the video clips immediately, rather than having to wait for compressed video to be delivered to him at a remote site. This demonstrates a somewhat primitive approach to generating video clips as quickly as possible.

In the applicant's view, MPEG is a poor standard for generating edited and editable video clips quickly for rapid distribution, since every frame in a region of an MPEG file must be decompressed before frame-by-frame editing can be performed, even when only some frames are required, such as during navigation and rough cut. After editing has been performed, the new MPEG file must again be compressed before it can be distributed. And the new MPEG file must be compressed in its entirety before it can be distributed. And multiple versions of the compressed file need to be generated, so that they can be provided as appropriate, based for example on viewing device screen size and the available bandwidth for transmission to the viewing device. Even in high performance systems, the uploading of an MPEG video clip for distribution can take about as long as the duration of the clip itself, and the upload time can be unpredictable, because it may depend on load rates on the available networks. The various versions of the MPEG video clip then need to be uploaded to a content provider, which takes even more time. The MPEG files then need to be downloaded for viewing, which also takes time.

What is needed is a technical solution to the technical problem of providing high quality video clips to the public more quickly.

Regarding technical disclosures in relation to video files and video file editing, reference may be had to EP1738365B1, WO2005101408A1, U.S. Pat. No. 8,255,802B2, WO2005048607A1, U.S. Pat. Nos. 9,179,143B2, 8,711,944B2, WO2007077447A2, U.S. Pat. No. 8,660,181B2, WO2017021688A1 and to PCT application number PCT/GB2018/050013, which are incorporated by reference.

SUMMARY OF THE INVENTION

According to a first aspect of the invention, there is provided a computer-implemented method of providing video clip playback, the method including the steps of:
(i) receiving a video feed;
(ii) converting the video feed into a compressed format structure, the compressed format structure including a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
(iii) uploading the compressed format structure to a first server;
(iv) receiving an electronic edit decision list which defines how to manipulate the compressed format structure;
(v) saving the electronic edit decision list to the first server, or to a second server;

(vi) receiving a request to provide in a web browser executing on a user terminal a video clip playback corresponding to a video clip defined by the compressed format structure and the electronic edit decision list;

(vii) sending to the web browser code executable in the web browser to provide the video clip playback corresponding to the video clip defined by the compressed format structure stored on the first server and the electronic edit decision list saved on the first server or on the second server, and (viii) responding to requests from the code when executing in the web browser, to provide content corresponding to the compressed format structure stored on the first server, in accordance with the electronic edit decision list saved on the first server or on the second server, to the web browser, to provide the video clip playback.

An advantage of the method is that video clips may be provided for playback very quickly. An advantage of the method is that video clips may be provided for playback before a corresponding "live" broadcast is available to the public. An advantage of the method is that video clips may be provided for playback without using MPEG format files. An advantage of the method is that video clips may be provided for playback to a user using a web browser executing on a user terminal.

In an example of a compressed format structure, the lowest level of temporal resolution of frames of the hierarchy provides a frame at every second, such as at 0 s, 1 s, 2 s, 3 s. The next lowest level of temporal resolution of frames of the hierarchy provides a frame at every half second, such as at 0.5 s, 1.5 s, 2.5 s, 3.5 s. But to play the frames at the resolution of the next lowest level of temporal resolution of frames of the hierarchy, it is necessary to use frames from the two lowest levels of the hierarchy, to provide frames at 0 s, 0.5 s, 1 s, 1.5 s, 2 s, 2.5 s, 3 s, 3.5 s. The next next lowest level of temporal resolution of frames of the hierarchy provides a frame at every quarter second, such as at 0.25 s, 0.75 s, 1.25 s, 1.75 s, 2.25 s, 2.75 s, 3.25 s, 3.75 s. But to play the frames at the resolution of the next next lowest level of temporal resolution of frames of the hierarchy, it is necessary to use frames from the three lowest levels of the hierarchy, to provide frames at 0 s, 0.25 s, 0.5 s, 0.75 s, 1 s, 1.25 s, 1.5 s, 1.75 s, 2 s, 2.25 s, 2.5 s, 2.75 s, 3 s, 3.25 s, 3.5 s, 3.75 s.

The method may be one in which the video feed is a live video feed. An advantage of the method is that video clips may be provided for playback before a corresponding "live" broadcast is available to the public.

The method may be one in which the live video feed is a live sports video feed.

The method may be one in which the video clip playback is real time video clip playback. An advantage of the method is that video clips may be provided for playback very quickly.

The method may be one in which converting the video feed into the compressed format structure is performed in real time. An advantage of the method is that video clips may be provided for playback very quickly.

The method may be one in which the code executable in the web browser is JavaScript code. An advantage is that video clip playback may be provided very simply in a web browser user interface familiar to a typical user, without requiring the user to install playback software or hardware.

The method may be one including the step of executing the code in the web browser to provide the video clip playback corresponding to the video clip defined by the compressed format structure stored on the first server and the electronic edit decision list saved on the first server or on the second server. An advantage of the method is that video clips may be provided for playback very quickly.

The method may be one including the step of the web browser code executing in the web browser to provide backwards play and forwards play at multiple speeds and at high displayed frame rate. An advantage of the method is that versatile playback functions are provided.

The method may be one including the step of the web browser code executing in the web browser to create no significant garbage while the web browser code is running. An advantage is very well controlled memory management while the code is running in the web browser. A further advantage is that the programming language garbage collector does not block program execution for long enough to cause skipped frames on playback.

The method may be one in which the web browser code is executable in the web browser without configuration or installation. An advantage is ease of use by a user.

The method may be one including the step of providing the compressed format structure in chunks to a video editor, wherein the video editor is operable to generate the electronic edit decision list. An advantage is that the video clip may be generated and accessed more quickly.

The method may be one in which the video editor is operable to provide editing accurate to a single frame. An advantage is that a video clip with the desired start frame and with the desired end frame may be generated. This is desirable, in order to generate very high quality video clips.

The method may be one in which the video editor is arranged to request and to receive frames at the highest level of temporal resolution in the hierarchy, in the vicinity of a selected frame.

The method may be one in which the video editor includes video/audio précis display hardware and/or software, which provides a visual summary of the video and/or audio, such as a navigation bar, which summarises the content at multiple temporal scales and allows fast and convenient jog and/or shuttle navigation through an action such as mouse clicking or dragging on a display, as well as further uses such as rapid scene detection and detection of significant parts of the content by an artificial intelligence (AI) algorithm.

The method may be one in which the first server is a cloud server. An advantage is more efficient distribution of a video clip to users situated on the world wide web.

The method may be one in which the second server is a cloud server. An advantage is more efficient distribution of a video clip to users situated on the world wide web.

The method may be one including the step of the electronic edit decision list being generated even though the compressed format structure has not finished being stored on the first server. An advantage of the method is that video clips may be provided for playback very quickly. An advantage of the method is that video clips may be provided for playback before a corresponding "live" broadcast is available to the public.

The method may be one including the step of the compressed format structure being stored on an ingest server, before the compressed format structure is uploaded to the first server. An advantage of the method is that video clips may be provided for playback very quickly. An advantage of the method is that video clips may be provided for playback before a corresponding "live" broadcast is available to the public.

The method may be one in which the code is executable to download relevant video, audio, still, text and other files, including metadata files, from the first server or from the ingest server.

The method may be one in which the code is executable to read and to interpret the electronic EDL.

The method may be one in which the code is executable to combine files in the compressed format structure to play back the edited video at any of the spatial resolutions in the compressed format structure. An advantage is the flexibility to deliver the most suitable spatial resolution given limitations on data delivery speed to the user terminal.

The method may be one including an Edit step, in which a video editor system enables editing of video, audio, slides, titles and other media and metadata through the first server, to provide one or more electronic Edit Decision Lists.

The method may be one including a Player view step, in which opening a browser or other software gives access to the edited videos by real time playback of the electronic EDLs saved in step (v).

The method may be one in which a Player, which runs entirely in JavaScript and has a relatively small footprint, is included in the web page code.

The method may be one including being able to provide video clips in less than 60 seconds from an original recording made using a video camera.

The method may be one including being able to provide video clips in less than 30 seconds from an original recording made using a video camera.

The method may be one including providing the video clip playback on a mobile computing device, on a mobile phone, on a smartphone, on a tablet computer, on a smart watch, on a laptop computer, on a desktop computers, or on a smart TV.

The method may be one in which the code is executable to provide live controls over some combination of video resolution, image size, playback speed, position through jog and/or shuttle, keyboard short cuts and other controls.

The method may be one in which the compressed format structure includes loss free compression.

The method may be one in which the loss free compression includes use of Transition Tables; an example of the use of Transition Tables is described in the "IMPROVEMENTS TO REPRESENTATIONS OF COMPRESSED VIDEO" section of this document.

The method may be one in which the code uses a video codec, wherein the video codec supports private keys to randomise the initial state of its Transition Tables, making each bitstream randomised.

The method may be one in which a new player, incompatible with a previous player, is generated by providing new private keys.

The method may be one in which an order in which video and audio of the compressed format structure is uploaded to the first server is determined by an upload ordering system.

The method may be one including the steps of the upload ordering system
(a) uploading non-uploaded compressed audio, where available, as the highest priority;
(b) uploading non-uploaded coarsest temporal resolution video frames as the next highest priority;
(c) uploading the non-uploaded next-coarsest temporal resolution video frames as the next highest priority;
(d) uploading in this way until all video and audio frames have been uploaded.

The method may be one in which the method includes use of an Electronic EDL interpreter library hardware and/or software to enable electronic EDLs, and the sources they link to, to be converted into decompressed frames and audio samples, in real time for playback.

The method may be one in which the method includes use of a Web-based video editor operable to create a cloud-hosted web page which can be accessed over a wide area network such as the internet and which contains a video player which plays back the published video.

The method may be one in which no time is required to upload an edited video to a renderer, or to a distribution network, because the video clip playback corresponds to a video clip defined by the compressed format structure and the electronic edit decision list, and because the video clip playback is provided using the web browser code.

In a different example, the method of the first aspect of the invention is modified to provide a method which includes only steps (i) to (v) of the method of the first aspect of the invention. In a different example, the method of the first aspect of the invention is modified to provide a method which includes only steps (i) to (vi) of the method of the first aspect of the invention. In a different example, the method of the first aspect of the invention is modified to provide a method which includes only steps (i) to (vii) of the method of the first aspect of the invention.

According to a second aspect of the invention, there is provided a processing system including a processor and a first server, the system configured to provide video clip playback, wherein
(i) the processor is configured to receive a video feed;
(ii) the processor is configured to convert the video feed into a compressed format structure, the compressed format structure including a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
(iii) the processor is configured to upload the compressed format structure to a first server;
(iv) the processor is configured to receive an electronic edit decision list which defines how to manipulate the compressed format structure;
(v) the processor is configured to save the electronic edit decision list to the first server, or to a second server wherein the system includes the second server;
(vi) the processor is configured to receive a request to provide in a web browser executing on a user terminal a video clip playback corresponding to a video clip defined by the compressed format structure and the electronic edit decision list;
(vii) the processor is configured to send to the web browser code executable in the web browser to provide the video clip playback corresponding to the video clip defined by the compressed format structure stored on the first server and the electronic edit decision list saved on the first server or on the second server, and
(viii) the processor is configured to respond to requests from the code when executing in the web browser, to provide content corresponding to the compressed format structure stored on the first server, in accordance with the electronic edit decision list saved on the first server or on the second server, to the web browser, to provide the video clip playback.

The system may be configured to perform a method of any aspect according to a first aspect of the invention.

In a different example, the system of the second aspect of the invention is modified to provide a system which includes only limitations (i) to (v) of the system of the second aspect of the invention. In a different example, the system of the second aspect of the invention is modified to provide a system which includes only limitations (i) to (vi) of the system of the second aspect of the invention. In a different example, the system of the second aspect of the invention is modified to provide a system which includes only limitations (i) to (vii) of the system of the second aspect of the invention.

According to a third aspect of the invention, there is provided a processor, wherein
(i) the processor is configured to receive a video feed;
(ii) the processor is configured to convert the video feed into a compressed format structure, the compressed format structure including a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
(iii) the processor is configured to upload the compressed format structure to a first server;
(iv) the processor is configured to receive an electronic edit decision list which defines how to manipulate the compressed format structure;
(v) the processor is configured to save the electronic edit decision list to the first server or to a second server;
(vi) the processor is configured to receive a request to provide in a web browser executing on a user terminal a video clip playback corresponding to a video clip defined by the compressed format structure and the electronic edit decision list;
(vii) the processor is configured to send to the web browser code executable in the web browser to provide the video clip playback corresponding to the video clip defined by the compressed format structure stored on the first server and the electronic edit decision list saved on the first server or on the second server, and
(viii) the processor is configured to respond to requests from the code when executing in the web browser, to provide content corresponding to the compressed format structure stored on the first server, in accordance with the electronic edit decision list saved on the first server or on the second server, to the web browser, to provide the video clip playback.

The processor may be configured to perform a method of any aspect according to a first aspect of the invention.

In a different example, the processor of the third aspect of the invention is modified to provide a processor which includes only limitations (i) to (v) of the processor of the third aspect of the invention. In a different example, the processor of the third aspect of the invention is modified to provide a processor which includes only limitations (i) to (vi) of the processor of the third aspect of the invention. In a different example, the processor of the third aspect of the invention is modified to provide a processor which includes only limitations (i) to (vii) of the processor of the third aspect of the invention.

According to a fourth aspect of the invention, there is provided computer code, downloadable to a web browser executing on a user terminal and executable in the web browser to provide a video clip playback corresponding to a video clip defined by a compressed format structure stored on a first server and an electronic edit decision list saved on the first server or on a second server, wherein the compressed format structure includes a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy, the computer code executable in the web browser to:
(i) request content corresponding to the compressed format structure stored on the first server, in accordance with the electronic edit decision list saved on the first server or on the second server, and
(ii) provide the video clip playback.

An advantage is that video clip playback may be provided very simply in a web browser user interface familiar to a typical user, without requiring the user to install playback software or hardware.

The computer code may be arranged not to generate significant quantities of garbage. An advantage is improved memory management. A further advantage is that the programming language garbage collector does not block program execution for long enough to cause skipped frames on playback.

The computer code may be Java code or JavaScript code.

The computer code may be executable in the browser without configuration or installation.

The computer code may be executable in the browser to provide one or more of the following options:
a choice of video size;
a full-screen option;
jog at full video playback resolution;
shuttle at full video playback resolution;
playback at multiple speeds forwards and backwards;
a help screen;
support for keyboard short cuts;
an informative navigation bar (177);
playback of a quickly provided published video clip, as soon as it is published;
gradual degradation of experience where bandwidth is limited;
minimal delays for buffering;
internal caches for compressed and decompressed data;
ability to skip frames on playback where required;
ability to clip sections of Ingest (1710) videos or FTL Web Player (1715) videos and republish new web pages containing these subsets.

The computer code may be executable in the browser to provide the video clip playback in real time without any pre-rendering.

The computer code may be executable in the browser to request content directly from an ingest (Edge) server, or from the cloud, which prioritises such uploads.

The computer code may be executable in the browser to request the relevant frames before they are reached and to play back as many frames as are available.

The computer code may be executable in the browser to maximise frame rate, without buffering, by downloading, decompressing and displaying appropriate groups of video frames as it plays back.

The computer code may be executable in the browser to use the most local copy of the files it requires, minimising server load, and maximising download speed.

The computer code may be executable in the browser such that memory used is allocated in one block at the start.

The computer code may be executable in the browser to use its own memory management system.

The computer code may be included in web page code.

In a different example, there is provided computer code, executable on a user terminal and not executable in a web browser, the computer code executable to provide a video clip playback corresponding to a video clip defined by a compressed format structure stored on a first server and an electronic edit decision list saved on the first server or on a second server, wherein the compressed format structure includes a hierarchy of levels of temporal resolution of frames, each respective level of the hierarchy including frames corresponding to a respective temporal resolution of the respective level of the hierarchy, but not including frames which are included in one or more lower levels of lower temporal resolution of frames of the hierarchy, the computer code executable on the user terminal to:
  (i) request content corresponding to the compressed format structure stored on the first server, in accordance with the electronic edit decision list saved on the first server or on the second server, and
  (ii) to provide the video clip playback.

Such a computer code different example could be provided in an application for a smartphone, for a tablet computer, for a desktop computer, for a smart watch or for a smart TV.

According to a fifth aspect of the invention, there is provided a system including the processing system of any aspect according to the second aspect of the invention, a user terminal, and the computer code according to any aspect of the fourth aspect of the invention, the computer code executing in the web browser on the user terminal.

BRIEF DESCRIPTION OF THE FIGURES

Aspects of the invention will now be described, by way of example(s), with reference to the following Figures, in which.

DETAILED DESCRIPTION

Figure 1:
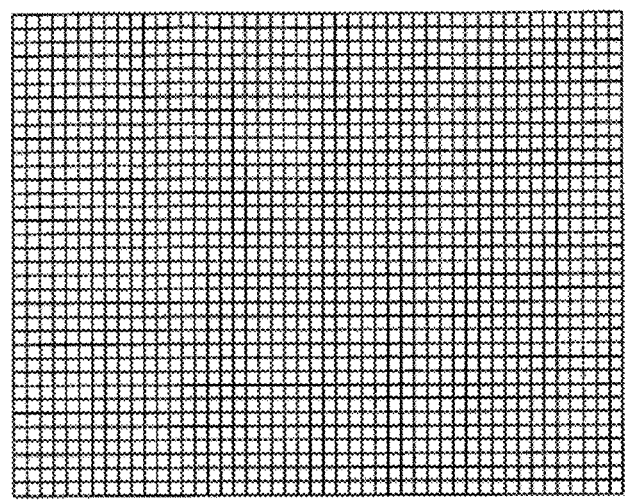
FIG. 1 shows a typical image of 376×280 pixels divided into 8×8 pixel super-blocks.

First of all, it is worth understanding what the term "live" on a television or radio broadcast actually signifies. To meet regulatory requirements, such as beeping out swear words or masking out offensive video content, the transmission is often delayed by up to 30 seconds. This gives time for the offending content to be deleted or replaced. You can hear this for yourself by taking part in a live radio phone in. Keeping the "live" illusion is the main reason they are always at pains to tell you to switch off any radios you have on—hearing a repeat of a previously broadcast section would give the game away. So, often "live" broadcast is not actually live, but delayed by 30 seconds or so.

Internet editing solutions often take in a "live" internet protocol (IP) video feed, such as in HTTP Live Streaming (HLS) format. With a ten second file chunk size, these formats can be forty seconds behind real time by the time they are published. For example, a typical data flow may introduce the following delays: 1 second compression latency on the feed coming in; 10 seconds wait to compress to the end of a 10 second chunk; 4 seconds to upload the default resolution to a server; 10 seconds to decompress and recompress in various data rates for distribution; 5 seconds for the player to realise the chunk is available; 10 seconds to download file to decompress; 5 seconds to decompress and display file (allowing some slack for lost packets so these don't break the smooth video playback).

The upshot is that whether the feed comes from a live TV broadcast (the smartphone pirated case) or a live HLS stream (the professional IP case), an approximately 30 second latency on the availability of the source limits the delay of the edited highlights to at least 30 seconds.

An advantage of the invention is that it may allow the edited content to appear before either the TV broadcast or the HLS internet feed arrives "live"—hence Faster than Live (FTL).

Example of a Method for Providing Video Clips Very Quickly

There is provided a Camera step (161), in which a camera or cameras represents any video source(s) which delivers a live feed, which passes on a live video feed to a video codec; the camera is for example a professional video camera with an SDI port, or a smartphone with a built-in camera, or a live e-Sports computer screen source. A video codec is an electronic circuit or software that compresses or decompresses digital video. It converts uncompressed video to a compressed format or vice versa. In the context of video compression, "codec" is a portmanteau of "enCODer" and "DECoder".

There is provided a Live ingest step (162) to one or multiple resolutions, including reading in video feed(s) and creating multiple resolution video output files for editing and playback in an internet-friendly format; uploading such videos to the cloud or other publicly accessible internet servers.

There is provided an Edit step (163), in which a video editor system enables editing of video, audio, slides, titles and other media and metadata through the cloud or other internet servers, to provide one or more electronic Edit Decision Lists.

There is provided a Cloud hosting step (164), in which the electronic Edit Decision Lists (EDLs) of videos or other media edited in the Edit step above are saved in the cloud, or other publicly accessible servers, where the sources for the edited videos are already uploaded, or are uploading from step 162 above.

There is provided a Player view step (165), in which opening a browser or other software gives access to the edited videos by real time playback of the electronic EDLs saved in step 164 including: reading and interpreting the electronic EDL in step 164; downloading relevant video, audio, still, text and other files (including metadata files) from the Cloud in step 164 or the Live ingest computer(s) in step 162; combining the files to play back the edited video at any of the resolutions mentioned in relation to step 162; giving the viewer live controls over some combination of video resolution, image size, playback speed, position through jog and/or shuttle, keyboard short cuts and other controls.

In an example, video clips may be provided in less than 30 seconds from the original recording made using a video camera. In an example, video clips may be provided in less than 60 seconds from the original recording made using a video camera.

The method may be used to enable the viewing of video clips on mobile computing devices, on mobile phones, on smartphones, on tablet computers, on smart watches, on laptop computers, on desktop computers, and on smart TVs. The method may be used to enable the viewing of video clips using a web browser.

Figure 16:
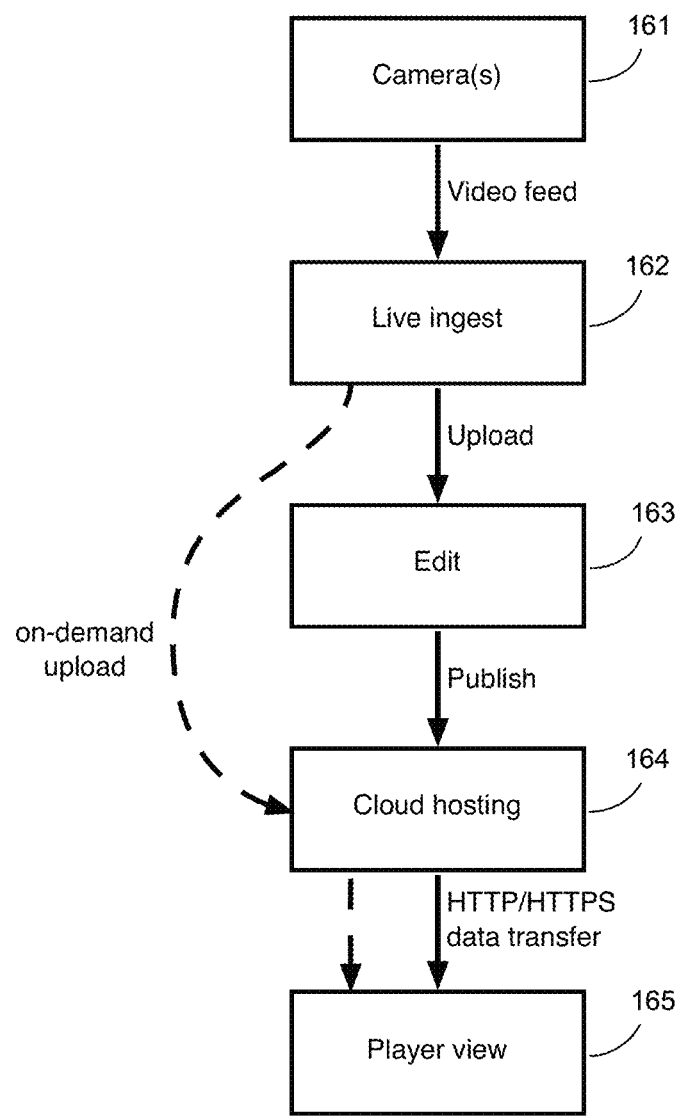
FIG. 16 is an example of a method for providing video clips very quickly.

An example of the above method for providing video clips very quickly is provided in FIG. 16.

Example of a System for Providing Video Clips Very Quickly

There is provided Loss free compression hardware and/or software (176). This is an optional system component for reducing the data rate of the compressed video output, eg. as output by step 162. The loss free compression system, such as Transition Tables (e.g. Forbidden Technologies' Transition Tables), an example of which is described in the "IMPROVEMENTS TO REPRESENTATIONS OF COMPRESSED VIDEO" section of this document, will typically have the following properties:
  it must (or should) run quickly so that it can handle the volume of data in live video feeds;
  it must (or should) not lock up for significant periods as the incoming live video stream will not wait for the compression;
  it must (or should) be able to compress live feeds as they come in, rather than seeing a whole file in order to compress the data;
In addition, the corresponding decompression will typically include the following properties:
  it must (or should) run quickly as the player may be real time;
  it must not (or should not) lock up for noticeable periods of time as the video playback must be smooth;
  it must not (or should not) generate significant quantities of garbage as garbage collectors in web languages such as JavaScript and Java can lock up for multiple video frames;
  it must (or should) have a small enough executable to be downloaded in a web page before the video is played without causing inconvenience to the user;
  it must (or should) have a small enough memory footprint to run in a browser.

There is provided Video/audio précis display hardware and/or software (177), which provides a visual summary of the video and/or audio, such as a navigation bar, which summarises the content at multiple scales and allows fast and convenient jog and/or shuttle navigation through an action such as mouse clicking or dragging on the display, as well as further uses such as rapid scene detection and (not detailed in this document, but as would be understood by one skilled in the art) detection of significant parts of the content by an artificial intelligence (AI) algorithm.

There is provided a Video codec hardware and/or software (178), including video compression/decompression hardware and/or software which allows the video to be compressed/decompressed, preferably with the following compression properties:
  the compression should be able to handle live sources in real time, preferably at multiple resolutions;
  the compressed video produced should be in a form which allows decompression of live feeds with low latency (for example, <5 seconds);
  the video quality should be sufficiently high for end viewers;
  the compression should preferably be fast enough to run in software on a standard device (e.g. a desktop computer);
  the compression should support a range of resolutions;
  the compression should create video which can be decompressed quickly from any point (eg. to support video editing and efficient navigation);
  the compression should produce compressed video which allows multiple (but not necessarily all) temporal subsets to be accessed without reference to content not included in those temporal subsets;
The video codec will typically also have the following decompression properties:
  the decompression must (or should) be efficient to allow real time playback;
  it must (or should) be possible to synchronise the video and the audio tracks;
  it must (or should) be possible to combine multiple video and audio tracks in real time so electronic EDLs can be rendered during playback;
  the decompression must (or should) be able to playback live feeds with low latency (e.g. <5 seconds);
  the ability to play backwards and forwards at multiple speeds and at high displayed frame rate;
  the decompression must not (or should not) create significant garbage while it is running, as garbage on typical web languages causes the software to lock up for the duration of multiple video frames.

There is provided an audio codec hardware and/or software (179), including audio compression/decompression hardware and/or software, which allows the audio to be compressed/decompressed, typically with the following compression properties:
  the compression should be able to handle live sources in real time;

the audio quality should be sufficiently high for end viewers;

the compression should preferably be fast enough to run in software on a standard device (eg. a desktop computer);

the compression should support a range of qualities and audio sample rates;

the compression should produce compressed audio which can be decompressed from a live stream with low latency (eg. <2 s).

The audio codec will typically also have the following decompression properties:

the decompression must (or should) be efficient to allow real time playback;

the decompression must (or should) be able to decompress a live stream with low latency (eg. <2 seconds);

it must (or should) be possible to synchronise multiple audio tracks to any video tracks;

it must (or should) be possible to combine multiple video and audio tracks in real time so electronic EDLs can be rendered during playback;

the decompression must not (or should not) create significant garbage while it is running, as garbage on typical web languages causes the software to lock up for the duration of multiple video frames.

There is provided an Ingest system (1710), which is a system for taking in a video feed, typically with the following additional features:

video and audio is compressed in real time;

video is uploaded to a host cloud system through a network link;

the order which video and audio is uploaded is determined by an Upload ordering system (1711).

In addition, the Ingest may include:

an upload proxy;

a download proxy;

the creation of a multi-scale video and/or audio summary (177).

the ability to render electronic EDLs locally.

There is provided an Upload ordering system (1711), which is a system implementing a method of deciding which media data to upload, uploading as requested by another application, such as a video editor or video player, or as a result of a request by a connected cloud server, including as a result of a request from an application connected to the cloud, or as a result of a mirror method which makes copies of content on the cloud. Mirroring ordering typically includes:

uploading non-uploaded compressed audio, where available, as the highest priority;

uploading non-uploaded coarsest temporal resolution video frames as the next highest priority;

uploading the non-uploaded next-coarsest temporal resolution video frames as the next highest priority;

uploading in this fashion until all video and audio frames have been uploaded.

In parallel, the mirror can request the upload of the précis (177).

There is provided a Download ordering system (1712), which enables applications using the video ingested by Ingest (1710) to request content. The download ordering provided includes:

frames of video and samples of audio which are required by an application to be displayed shortly;

when playing, frames ahead of the current play position which are expected to be displayed shortly;

when not playing, frames in the vicinity of the current play position which could be jogged or shuttled to shortly display, given the current resolution of the navigation tool, or frames which could be played back shortly if the video playback was to be started. In addition, a sprinkling of frames across the navigation bar are downloaded so nearby frames can be accessed quickly during shuttle.

In one implementation, the frames are downloaded in chunks, each chunk being split into multiple files of video frames of decreasing temporal spacing, and multiple files are downloaded concurrently, with only one file from each chunk being downloaded at a time.

There is provided an Electronic EDL interpreter library hardware and/or software (1713) which allows electronic EDLs, and the sources they link to, to be converted into decompressed frames and audio samples, in real time for playback. It also allows random access to frames of video via a navigation bar, such as the précis (177). Where there is insufficient bandwidth to download all the content before it is required, the library returns a lower video frame rate. It also gives the option to select the video bitstream from a choice of video resolutions, altering the bandwidth requirements. It also includes an internal cache which contains compressed video and audio, as well as decompressed video frames and audio samples. It also renders electronic EDLs in real time, supporting multiple concurrent video and audio tracks. In the preferred implementation, it supports 12 video and 36 audio tracks.

There is provided a Web-based video editor (1714): a video editor which runs in a web browser, or is launched from a web browser, which, in the preferred implementation, doesn't require configuration or installation of software written by a supplier of this technology. The editor should ideally be frame accurate, work in conjunction with the other components shown in FIG. 17 to improve performance, and it must support an option, which, very quickly (eg. in a fraction of a second), creates a cloud-hosted web page which can be accessed over a wide area network such as the internet and which contains a video player which plays back the published video.

There is provided a Web Player (1715), such as a JavaScript player (e.g. Blackbird's JavaScript player), in which the Web Player runs in a browser without configuration or installation, accessible to a wide audience, which allows playback of live and/or edited content, with a range of options which may include, amongst others:

a choice of video size;

a full-screen option;

jog at full video playback resolution;

shuttle at full video playback resolution;

playback at multiple speeds forwards and backwards;

a help screen;

support for keyboard short cuts;

an informative navigation bar, eg. (177);

playback of a quickly provided published video clip, as soon as it is published;

gradual degradation of experience where bandwidth is limited;

minimal delays for buffering;

internal caches for compressed and decompressed data;

ability to skip frames on playback where required;

ability to clip sections of Ingest (1710) videos and republish new web pages containing these subsets.

In an example, video clips may be provided in less than 30 seconds from the original recording made using a video camera. In an example, video clips may be provided in less than 60 seconds from the original recording made using a video camera.

The system may be used to enable the viewing of video clips on mobile computing devices, on mobile phones, on smartphones, on tablet computers, on smart watches, on laptop computers, on desktop computers, and on smart TVs. The system may be used to enable the viewing of video clips using a web browser.

Figure 17:
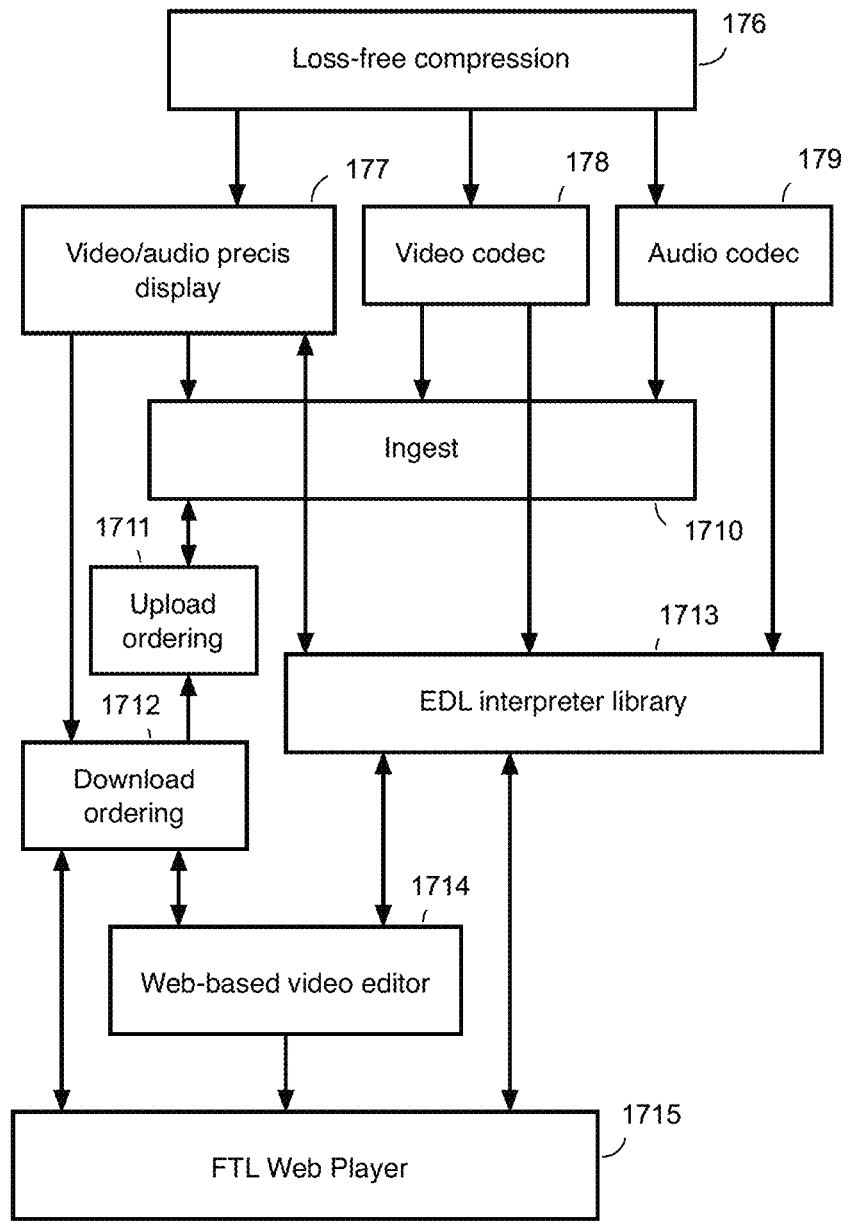
FIG. 17 is an example of a system for providing video clips very quickly.
Figure 18:
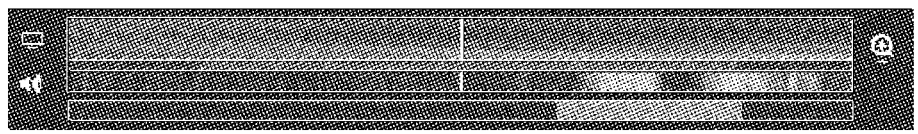
FIGS. 18 to 22 provide examples of a sequence of source image frames processed to provide a method of enabling efficient navigation of video.
Figure 19:
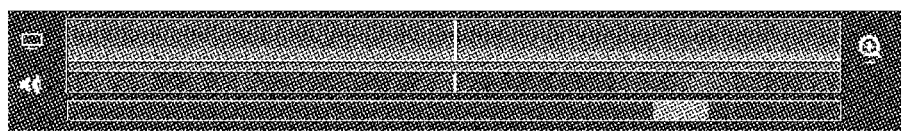
Figure 20:
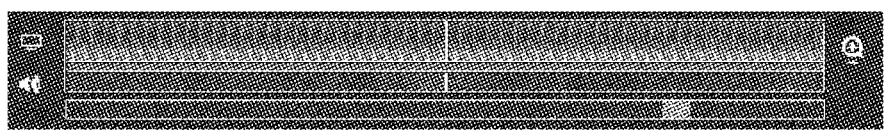
Figure 21:
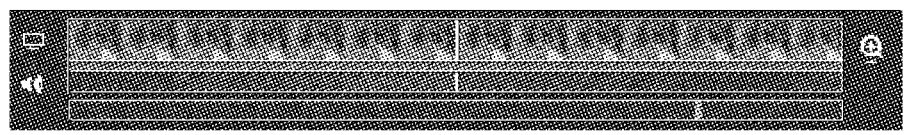
Figure 22:
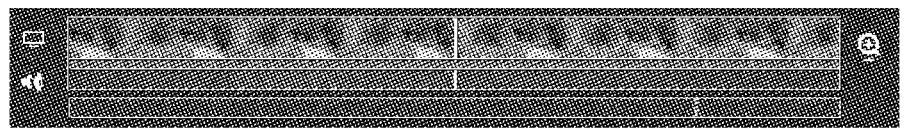
Figure 23:
FIG. 23 is an example of additional horizontal reductions, in a method of enabling efficient navigation of video.
Figure 24:
FIG. 24 is an example of a computer display providing a method of enabling efficient navigation of video.

An example of the above system for providing video clips very quickly is provided in FIG. 17. In FIG. 17, each arrow signifies "is used by".

Example Workflow

In an example, the workflow comprises four elements: (1) Ingest, (2) Editing, (3) Publishing and (4) Distribution.

(1) Ingest. A video suite (e.g. the Blackbird video suite (www.blackbird.video)) allows live ingest from Serial Digital Interface (SDI) feeds. This uses the sources production staff can use to decide whether to add beeps to the audio, or other censorship methods. These feeds are available at the broadcaster through physical SDI cables, and have no 30 second latency—in fact not even a one frame latency. By using these feeds, the client has an immediate up to 30 second advantage over pirates recording the broadcast source.

Ingest software (eg. Forbidden's ingest software (http://www.forbidden.co.uk/products/apps/)) running on local hardware, such as a Blackbird Edge Server, can compress the video stream as it comes in, transcoding it into a specialist cloud video editing proxy codec, eg. Blackbird codec, which is designed to support efficient cloud editing.

Blackbird Edge Server (https://www.blackbird.video/) enables the ingest of live and non-live content from baseband SDI, IP streams, and files. Encoded streams are captured to mezzanine (that is, a lower resolution version of the original source which is good enough quality to render published edits from), high resolution and the unique Blackbird proxy for use within the Blackbird Cloud platform. Both stream and file-based content can be used for a variety of enrichment, production, captioning and publishing workflows.

Blackbird is a proprietary video codec developed by Forbidden Technologies and used by their flagship product (now renamed from Forscene to Blackbird). Blackbird is designed for both editing and video playback over variable speed internet connections. Blackbird can provide consistent picture quality on slow connections by allowing the player, editor or other application to vary the frame rate of the video downloads and subsequent decompression and playback. The Blackbird video codec facilitates a content-aware dynamic frame rate. The codec can create a lightweight proxy, which can be used to deliver a live stream from an event.

The Forbidden Technologies video formats, such as Blackbird 9, include one or more chunks of video information, each typically covering approximately one or two seconds of video content, with audio information in sections of typically ten seconds. These sections are often combined in sections of e.g. 20 chunks at a time to increase storage efficiency and access speed from hard disk storage. But while they are being combined, the ingest server makes each section available without waiting for the subsequent sections.

In an example application of the above technical approach, a 32 frame section of video shot in 30 frame per second NTSC video format may be available for upload to the cloud for editing just over a second after the relevant frame was recorded and the live action happened.

(2) Editing. An editor (e.g. the Blackbird editor), which runs on a local computer connected to a cloud back end, pulls ingested video down from the cloud as required. If the relevant frames of video being requested have not yet been uploaded into the cloud, the cloud server hosting the editor (e.g. the Blackbird editor) pulls the video up from ingest server (eg the Blackbird Edge Server) where it is being ingested and then passes it on to the editor.

Each period of video proxy is split into pieces representing the period of time, but containing information about different frame rates in the period. This allows very rapid editing of near live content, even over relatively slow connections.

A method may be provided which allows rapid navigation of the live feeds. An example is provided in the "A Method for Enabling Efficient Navigation of Video" section of this document. The splitting of each period of video allows clip in and out points to be selected to frame accuracy without having to display or even download all the frames in a clip. As a result, clips can be chosen with perfect frame accuracy in less time than it takes the person editing the content to view or even download each clip. Clips can be logged and/or reviewed in parallel.

Similarly, clips can be combined in the editor (e.g. the Blackbird editor) instantly as they are selected, making it possible to edit content as it comes in with minimal latency compared to the live feed.

Consequently, a period of action which takes 20 seconds can have clips chosen from it and edited together while the action is going on, and the edit completed shortly after the action has finished. The editor can also add standard effects including (but not limited to) titles, transitions, colour correction, audio levels, logos, and branded sting video clips at the start and end of the edited video. The stings may be added automatically each time the video is published. A logo sting is the little animation of a logo at the end of a video or commercial.

Thus a 20 second period of action may be fully edited by 25 seconds after the action starts, ie 5 seconds after it ends. On a broadcast with a 30 second transmission delay, the edit in this case would be finished 5 seconds before the start of the source is broadcast.

(3) Publishing. In typical commercial solutions, publishing of edited internet video typically requires a video file in a standard player format, such as MPEG. This file must be made by rendering the edits from the original sources, with titles, colour correction, audio levels, stings and any other edited features being calculated frame-by-frame and the result incorporated into the new video file. A 10 second edited highlight can require around 10 seconds to render before it can be distributed—and a further few seconds to upload to the next stage of the workflow. A minute long edit (for example an altercation) could take a minute to render and significant time to upload.

A JavaScript player (e.g. Blackbird's JavaScript player) may allow the edited video to be played back in real time without any pre-rendering. The JavaScript player (e.g. Blackbird's JavaScript player) plays back in real time by rendering the edits on the fly, like the editor (eg. the Blackbird editor) used to create the edits in the video in the first place. The result is that the publishing is essentially instant: all that needs to happen is that the player needs to be told where the electronic Edit Decision List (EDL) is stored in the cloud. The electronic EDL already points to the relevant content, also accessible through the cloud, needed to construct the finished video.

An edit decision list or EDL is used in the post-production process of film editing and video editing. The list contains an ordered list of reel and timecode data representing where each video clip can be obtained in order to conform the final cut. EDLs are created by editing systems, or can be paper documents constructed by hand such as shot logging. These days, linear video editing systems have been superseded by non-linear editing (NLE) systems which can output EDLs electronically to allow autoconform—the recreation of an edited programme from the original sources (usually video tapes) and the editing decisions in the EDL. Electronic EDLs are also often used in the digital video editing world, so rather than referring to reels they can refer to sequences of images stored on disk.

Consequently, it takes essentially no time to publish edited videos which have been edited (e.g. in Blackbird editor) for playback on the web-based player (e.g. Blackbird's JavaScript player).

(4) Distribution. In a traditional system, an editor must upload a flat rendered edited video master to a re-renderer device which makes multiple versions from the master. These are made at various data rates and qualities at different devices and connection speeds. This upload can take anywhere from seconds to minutes, depending on the ease of moving the content from a local edit computer to the re-renderer system. This re-renderer then has to produce multiple copies, which again takes time. This content then needs to be moved to the distribution network servers. Finally, in order to view the content, the end user must download this video for playback. This process can take significant time for a live event situation, where time is of the essence.

The technical approach in this example works differently—and much faster. The proxy video as ingested live is already of a quality suitable for distribution. Also, by the time it is published, it is typically already in the cloud (eg. the Blackbird Cloud). The cloud service used (e.g. the Blackbird Cloud, which is hosted on the internet backbone) has significant bandwidth—sufficient for distribution to end users.

Furthermore, the ingest process can produce multiple proxies concurrently, each at a different resolution. Any proxy can play over a wide range of bandwidth connections with no delays for buffering during playback: the player can skip frames if the download is too slow to play every frame. In this case, where the bandwidth is insufficient to playback every frame, the displayed frames are approximately evenly spaced, with audio prioritised, to maximise the viewer experience.

On a low bandwidth connection, smaller proxy videos will need lower bandwidth and consequently play at a higher frame rate than a larger proxy. Hence there is no need for a separate re-render stage for multiple resolutions—the viewer chooses a resolution of the appropriate size for their bandwidth, and the web-based player (e.g. Blackbird's JavaScript player) plays back the edit from the proxy videos of the relevant size. Although this process can be automated, the manual option allows the viewer some control over the bandwidth of their feed—important on expensive data-limited mobile contracts.

In combination, these features mean that readying the published video for distribution takes a very small amount of time.

When the player uses Hypertext Transfer Protocol (HTTP) files, these can be cached in the local browser and at devices all along the internet route, significantly reducing the load on the cloud service (eg. the Blackbird Cloud). The more popular a video, the better it will cache (giving a higher cache hit rate), and the higher the serving efficiency. If the demand is sufficiently widely distributed to overload the server, despite the caching, the system may automatically reduce the frame rate of the video players, while allowing playback to continue without stopping. When the full server bandwidth is saturated, not all users can see full frame rate, and frame rates start to drop (while still providing video and audio without delays for buffering). The continuous adaptation allows a high (e.g. up to 20×) number of concurrent users to experience continuous video (with audio), at ever lower frame rates.

In this example, no time is required to upload the edited video to a renderer, or to a distribution network, because the video is already the right content in the right place, and because the edited video is played back using the web-based player (e.g. Blackbird's JavaScript player) which uses an electronic EDL to select and play the edited video in real time.

Conclusion

The example workflows allow live video productions to be ingested, edited, published, distributed and viewed in seconds—faster than the typical up to 30 s live delay for broadcast television.

Details of Some Components in an Example System

Ingest

Low Latency to Editor

Problem solved: fastest possible publish—editing has to start as soon as possible. Solution: video must be put into chunks (chunked) as there are too many frames to upload efficiently separately. Chunks cannot be entire video because this makes editing out subsections slow. Chunks are described in more detail in the section of this document entitled "A Method Of Compressing Video Data And A Media Player For Implementing the Method".

Chunking of Frames

Problem solved: Fast access to any part of the content; playback at any speed to allow efficient navigation; network friendly access.

Solution: A chunk is all the frames between one point in time and another point in time. Frames in a chunk are stored in temporal groups, with differing separation/temporal density for the frames in each group. Groups from eg 20 consecutive chunks can be combined to minimise number of disc accesses. A navigation tool (eg. Blackbird Waveform) at various zoom levels can access all frames for a number of group levels, depending on the zoom (except when zoomed right out when only some key frames can be accessed). An example of such a navigation tool is provided in the "A Method for Enabling Efficient Navigation of Video" section of this document.

Upload Priorities

Problem solved: to allow useful access as soon as possible, and before all the content is uploaded.

Solution: the audio is uploaded first (and very quickly because of its low data rate). When this is up to date, the key frame groups are uploaded. When both of these uploads are up to date, the coarsest temporal resolution delta frames are uploaded. When all of the above uploads are up to date, the next coarsest temporal resolution is uploaded etc. until all the content is uploaded. As new groups arrive during a live video ingest, the process starts each new upload by looking at the highest priorities first, as above. The editor or other application software can request higher temporal resolution groups near the current frame being viewed in the editor or other application allowing frame accurate editing or navigation around points of interest (such as in and out points), so frame accurate edits can be completed (and published with an example system) before the remainder of the groups within the clip are fully uploaded, with the result that you don't have to wait for the finest grained frames to arrive before you can complete your frame accurate edit.

Multiple Concurrent Proxy Sizes

Problem solved: To allow viewers to influence the amount of internet bandwidth they use; to support viewers and editors with varying internet connection speeds, screen areas and processing time.

Solution: ingest produces video files at multiple resolutions concurrently eg 180p, 216p, 288p, 360p, 540p, 720p, 1080p. These are all 16:9 width:height ratio but this is not a requirement, with 9:16, 1:1, 4:3, and other ratios as required. (In the case of an MPEG-style source, the source is decoded only once, and compressed to all these resolutions.) (Pixels are averaged when producing lower resolution versions to reduce noise.)

A Suitable Codec (eg. Blackbird Codec)

Problem solved: standard video codecs cannot deliver either easy access or a good experience for cloud video activities, including navigation, editing and fast publishing, and to some extent playback.

Solution: A tailor made suitable cloud video codec which allows rapid workable access to the content from any point, which is efficient enough to run in a browser without installation or configuration (because of its efficient use of processor time), can work on limited internet bandwidth, and supports responsive experience by use of such features as caching and speculative processing. Related disclosures are provided in the "A METHOD OF COMPRESSING VIDEO DATA AND A MEDIA PLAYER FOR IMPLEMENTING THE METHOD" and "IMPROVEMENTS TO REPRESENTATIONS OF COMPRESSED VIDEO" sections of this document.

Mobile App Options

Problem solved: mobile devices are the commonest computing-enabled devices, and they lack powerful cloud video tools.

Solution: Initially apps for Android tablets and phones, Apple iPad, and later web-based player (eg. JavaScript Blackbird Player) for playback in mobile web browsers. Unlike hardware supported MPEG solutions, the technical approach (eg. the Blackbird solution) is entirely in software and can support numerous features other than video playback, including high frame rate display during shuttling, clipping and sharing, playback at multiple speeds etc.

Edit

Navigation (eg. Blackbird Waveform Navigation)

Problem solved: to show a précis of a video+audio video, which highlights activity (or lack of it) in a video. It also affords quick access to relevant areas of a video.

Solution: An example of such a navigation tool is provided in the "A Method for Enabling Efficient Navigation of Video" section of this document. The tool should display a summary of a video where every frame influences the visible display, and the summary can be displayed at a vast range of scales from multiple levels of frame accurate access to, in principle, any level of coarseness. There is a visual metaphor associating time in the Navigation (eg. Blackbird Waveform navigation) tool to horizontal space in many scenes. This makes the tool very intuitive.

A navigation tool (eg. Blackbird Waveform) at various zoom levels can access all frames for a number of group levels, depending on the zoom (except when zoomed right out when only some key frames can be accessed). An example of such a navigation tool is provided in the "A Method for Enabling Efficient Navigation of Video" section of this document.

Real Time Playback/Rendering

Problem: waiting for rendering slows down editing process

Solution: software that is so efficient that it renders during playback

Responsiveness

Possible Solutions: folder loads; navigation tool resolution downloads; zoomed out navigation tool in solid-state drive (SSD) database (DB); key frames in SSD-DB to speed up shuttling; caching of decompressed frames (and compressed frames); multi-core decoding; few buttons on interface by using secondary mouse clicks and drags for advanced features, drag and drop combines a source with an action (determined by the destination).

Upload on Demand where Needed

Problem: Video may not all be yet uploaded to cloud

Solution: Edit software, player software, and other applications, downloads video from the cloud (eg the Blackbird cloud), often speculatively, when it calculates you will be needing it.

Primary and Secondary Buttons for Simple Usage and Advanced Ones

Problem: Beginners need to be able to learn how to use the system quickly without irrelevant user interface clutter; advanced users need quick and efficient access to comprehensive capabilities. Making use of a secondary button to give an advanced version of the primary button action eg single step backwards and forwards, enable audio/enable audio levels, colour correction on video window, open files root or previous folder, undo/redo. This secondary button halves the number of buttons, simplifying the interface appearance and allowing bigger buttons which makes it faster to use. Plays buttons are video windows themselves—the biggest buttons on the screen (we introduced this idea back in 1991).

Built in Chat

Problem: Communication between team members (including support) is difficult both globally and even on a different floor of the same building.

Solution: Built in chat where you can share ideas through text and video content privately or publicly, as well as get technical support.

Remote Control (eg. Blackbird Remote Control)

Problem: Supporting someone who is new and doesn't even know the names used for the buttons Solution: Remote control allows the support member to control the user's editor instance (eg. Blackbird editor) remotely from his/her own computer. No software is installed on the client machine, as everything runs through the editor via the cloud and runs in the editor sandbox.

Drag and Drop Allows Compatibility with Mobile App Versions

Problem: People want to run software on their mobiles, which don't have a keyboard or mouse; people have big fingers compared with the accuracy of a mouse pointer.

Solution: use drag and drop interface with big buttons.

Launched from a Browser

Problem: Many companies don't allow installation of software; users may not be allowed to install software on other people's computers, which they might want to use to run our cloud software; software can be out of date. Availability of video editing software running without installation is limited.

Solution: Cloud software launched from browser, running without configuration or installation. We are the leaders in providing such tools.

Problem: Garbage collection, a process whereby unused memory is freed up by the system automatically, is not generally under the control of the software, and also not generally suitable for a real time environment as program execution can lock up during this process Solution: Write an entire infrastructure, including video codecs and windowing library, which doesn't generate garbage in Java or JavaScript (as in the Blackbird system, for example).

Publish

FTL supports the near instant creation of a web page suitable for being in an iframe (a Hypertext Markup Language (HTML) element), with an electronic EDL player.

Problem: How to get an edited video viewable on the web as quickly as possible.

Solution: to, in a fraction of a second, make a stand-alone page, containing embeddable edited video, which is hosted in the cloud on a fast internet connection.

Drag and Drop Integrated Publishing

Problem: How to get edited video from your editing system to viewers quickly.

Solution: We implement a system of preset buttons which act as drag and drop targets, which produce the result specified in the settings eg resize window options, electronic EDL republish via clipping interface, help button options, full screen playback options, or as appropriate.

Distribution/Viewing

Playback from Web Page

See above

PC/Mac/Mobile via Browser

Playback using web-based player (e.g. Blackbird's JavaScript player) renders electronic EDL without installation.

Problem: A viewer needs to see an edited video without delay. Rendering and uploading an edited video takes time, delaying viewing and thus causing a cost.

Solution: Make video available without rendering via a web link which plays on browsers. Video is hosted on the cloud (eg. Blackbird Cloud) and is available anywhere in the world. The video is played back using a web-based player (e.g. Blackbird's JavaScript player), which plays back the videos represented by the edits in real time on any PC/Mac/modern mobile device. Multiple resolutions are available.

JavaScript Implementation

Problem: video player software needs to play back on any device without requiring installation or configuration. Java, for example, is not always pre-installed these days.

Solution: The video is compressed using a suitable compressor (eg. Blackbird®) and the Player, which runs entirely in JavaScript and has a relatively small footprint, is included in the web page code. Suitable compressors are described in the "A METHOD OF COMPRESSING VIDEO DATA AND A MEDIA PLAYER FOR IMPLEMENTING THE METHOD" and "IMPROVEMENTS TO REPRESENTATIONS OF COMPRESSED VIDEO" sections of this document. New more efficient implementations, such as WebAssembly, are also supported. This takes less storage, runs faster, and increases efficiency further.

Frame Accurate Navigation in Player

A navigation tool (eg. Blackbird Waveform) is provided. An example of such a navigation tool is provided in the "A Method for Enabling Efficient Navigation of Video" section of this document.

Clipper on Player with Republishing

Problem: You want to enable viewers to share part of your published video—for example to share a scene from a film or a news story from a news programme.

Solution: The web-based player (e.g. Blackbird's JavaScript player) includes a clipper option, which generates a new web page which contains a subset of the video clip between marked in and out points. This can be played back (and re-clipped) in the same way as the original. In FTL, generating this is as fast as the original publish.

Any Material Not Uploaded is Still Visible on Demand

Problem: Your ingest takes place in a limited bandwidth environment. You want to enable viewers to watch your edited video even before the whole content is uploaded.

Solution: the web-based player (e.g. Blackbird's JavaScript player) is allowed to request content directly from the ingest (Edge) server, or from the cloud, which prioritises such uploads. This allows viewers to watch content which hasn't finished uploading. The web-based player (e.g. Blackbird's JavaScript player) requests the relevant frames before they are reached and plays back as many frames as are available.

Choice of Image Size During Playback

Problem: Bandwidth may be costly or limited on a viewer's device in their location, and processor time may be limited. They don't necessarily want to download the highest quality video available.

Solution: The example system supplies multiple resolutions. The user can switch between them.

A navigation tool (eg. Blackbird Waveform) is provided. An example of such a navigation tool is provided in the "A Method for Enabling Efficient Navigation of Video" section of this document.

Automatic Adaptation for Low Bandwidth Client Internet

Problem: Client may have limited bandwidth to play back video.

Solution: Rather than buffer, the web-based player (e.g. Blackbird's JavaScript player) maximises frame rate (without buffering) by downloading, decompressing and displaying appropriate groups of video frames as it plays back.

Automatic Adaptation for the Internet Connection Speed of Busy Servers

Problem: Server bandwidth may be saturated by hosting of popular videos.

Solution: Clients limit their frame rate requested to match the amount they are actually downloading by only requesting a higher frame rate group when the lower groups have all arrived. As a result, the server automatically serves lower frame rates to users to meet the limit of its available upload bandwidth.

Cached Video for Playback

Problem: The same video is served to multiple people wasting server bandwidth and increasing cost.

Solution: Videos are cacheable by any switch or proxy on the internet between the server and the client. Thus the web-based player (e.g. Blackbird's JavaScript player) can use the most local copy of the files it requires, minimising server load, and maximising download speed.

Private Key Encryption (eg. Blackbird Private Key Encryption)

Problem: Some videos are charged for. How do you allow HTTP and hence caching and low server load by not encrypting all the videos, while giving some level of protection to the videos?

Solution: Where HTTPS is not required, the video codec (eg. Blackbird video codec) also supports private keys to randomise the initial state of its Transition Tables, making each bitstream randomised. Each player can contain this private key, but if the video codec is not a published standard (eg. because it is a Blackbird video codec), there are currently no third party players, and it would be uneconomical to hack a player. New incompatible players can be generated easily by providing new keys, so any attempt to create a pirated player could be made incompatible quickly, limiting its utility and useful lifetime—in a world of FTL where value is time-sensitive.

Improvements to Representations of Compressed Video

This section of this document relates to disclosures made in WO2005048607A1, U.S. Pat. Nos. 9,179,143B2 and 8,711,944B2.

There is provided a method of compressing digital data comprising the steps of (i) reading digital data as series of binary coded words representing a context and a codeword to be compressed, (ii) calculating distribution output data for the input data and assigning variable length codewords to the result; and (iii) periodically recalculating the codewords in accordance with a predetermined schedule, in order to continuously update the codewords and their lengths.

This disclosure relates to a method of processing of digital information such as video information. This digital video information may be either compressed for storage and then later transmission, or may be compressed and transmitted live with a small latency.

Transmission is for Example Over the Internet.

There is a need for highly efficient compression techniques to be developed to enable transmission of video or other data in real time over the internet because of the restrictions in the bandwidth. In addition, the increasing need for high volume of content and rising end-user expectations mean that a market is developing for live compression at high frame rate and image size.

An Object of this Disclosure is to Provide Such Compression Techniques.

The video to be compressed can be considered as comprising a plurality of frames, each frame made up of individual picture elements, or pixels. Each pixel can be represented by three components, usually either RGB (red, green and blue) or YUV (luminance and two chrominance values). These components can be any number of bits each, but eight bits of each is usually considered sufficient.

The human eye is more sensitive to the location of edges in the Y values of pixels than the location of edges in U and V. For this reason, the preferred implementation here uses the YUV representation for pixels.

The image size can vary, with more pixels giving higher resolution and higher quality, but at the cost of higher data rate. Where the source video is in PAL format, the image fields have 288 lines with 25 frames per second. Square pixels give a source image size of 384×288 pixels. The preferred implementation has a resolution of 376×280 pixels using the central pixels of a 384×288 pixel image, in order to remove edge pixels which are prone to noise and which are not normally displayed on a TV set.

The images available to the computer generally contain noise so that the values of the image components fluctuate. These source images may be filtered as the first stage of the compression process. The filtering reduces the data rate and improves the image quality of the compressed video.

A further stage analyses the contents of the video frame-by-frame and determines which of a number of possible types pixel should be allocated to. These broadly correspond to pixels in high contrast areas and pixels in low contrast areas.

The pixels are hard to compress individually, but there are high correlations between each pixel and its near neighbours. To aid compression, the image is split into one of a number of different types of components. The simpler parts of the image split into rectangular components, called "super-blocks" in this application, which can be thought of as single entities with their own structure. These blocks can be any size, but in the preferred implementation described below, the super-blocks are all the same size and are 8×8 pixel squares. More structurally complex parts of the image where the connection between pixels further apart is less obvious are split up into smaller rectangular components, called "mini-blocks" in this application.

It is apparent that if each super-block is compressed separately, the errors resulting from the compression process can combine across edges between super-blocks thus illustrating the block-like nature of the compression by highlighting edges between blocks, which is undesirable. To avoid this problem, the mini-blocks are tokenised with an accurate representation and these are compressed in a loss free way.

Each super-block or mini-block is encoded as containing YUV information of its constituent pixels.

This U and V information is stored at lower spatial resolution than the Y information, in one implementation with only one value of each of U and V for every mini-block. The super-blocks are split into regions. The colour of each one of these regions is represented by one UV pair.

Real Time Filtering

An aim is to remove noise from the input video, as noise is by definition hard to compress. The filtering mechanism takes frames one at a time. It compares the current frame with the previous filtered frame on a pixel-by-pixel basis. The value for the previous pixel is used unless there is a significant difference. This can occur in a variety of ways. In one, the value of the pixel in the latest frame is a long way from the value in the previous filtered frame. In another, the difference is smaller, but consistently in the same direction. In another, the difference is even smaller, but cumulatively, over a period of time, has tended to be in the same direction. In these the first two cases, the pixel value is updated to the new value. In the third case, the filtered pixel value is updated by a small amount in the direction of the captured video. The allowable error near a spatial edge is increased depending on the local contrast to cut out the effects of spatial jitter on the input video.

Real Time Motion Estimation

The video frames are filtered into "Noah regions". Thus the pixels near to edges are all labelled. In a typical scene, only between 2% and 20% of the pixels in the image turn out to have the edge labelling. There are three types of motion estimation used. In the first, whole frame pan detection using integer number of pixels is implemented.

These motions can be implemented efficiently over the whole image on playback as pixels can be copied to new locations and no blurring is needed. This uses the edge areas from the Noah regions only, as the edges contain the information needed for an accurate motion search. The second is sub-pixel motion removal over the whole image.

This uses the edge areas from the Noah regions only, as the edges contain the information needed for an accurate motion search. The edge pixels in the image, estimated by example from the Noah filtering stage, are matched with copies of themselves with translations of up to e.g. 2 pixels, but accurate to e.g. $\frac{1}{64}$ pixel (using a blurring function to smooth the error function) and small rotations. The best match is calculated by a directed search starting at a large scale and increasing the resolution until the required sub-pixel accuracy is attained. This transformation is then applied in reverse to the new image frame and filtering continues as before. These changes are typically ignored on playback. The effect is to remove artefacts caused by camera shake, significantly reducing data rate and giving an increase in image quality. The third type examines local areas of the image. Where a significant proportion of the pixels are updated, for example on an 8×8 pixel block, either motion vectors are tested in this area with patches for the now smaller temporal deltas, or a simplified super-block representation is used giving either 1 or 2 YUVs per block, and patches are made to this.

Real Time Fade Representation

The encoding is principally achieved by representing the differences between consecutive compressed frames. In some cases, the changes in brightness are spatially correlated. In this case, the image is split into blocks or regions, and codewords are used to specify a change over the entire region, with differences with these new values rather than differences to the previous frame itself being used.

Segment Noah Regions-Find Edges

A typical image includes areas with low contrast and areas of high contrast, or edges. The segmentation stage described here analyses the image and decides whether any pixel is near an edge or not. It does this by looking at the variance in a small area containing the pixel. For speed, in the current implementation, this involves looking at a 3×3 square of pixels with the current pixel at the centre, although implementations on faster machines can look at a larger area. The pixels which are not near edges are compressed using an efficient but simple representation which includes multiple pixels-for example 2×2 blocks or 8×8 blocks, which are interpolated on playback. The remaining pixels near edges are represented as either e. g., 8×8 blocks with a number of YUV areas (typically 2 or 3) if the edge is simply the boundary between two or more large regions which just happen to meet here, or as 2×2 blocks with 1 Y and one UV per block in the case that the above simple model does not apply e.g. when there is too much detail in the area because the objects in this area are too small.

Miniblockify

The image is made up of regions, which are created from the Noah regions. The relatively smooth areas are represented by spatially relatively sparse YUV values, with the more detailed regions such as the Noah edges being represented by 2×2 blocks which are either uniform YUV, or include a UV for the block and maximum Y and a minimum Y, with a codeword to specify which of the pixels in the block should be the maximum Y value and which should be the minimum. To further reduce the data rate, the Y pairs in the non-uniform blocks are restricted to a subset of all possible Y pairs which is more sparse when the Y values are far apart.

Transitions with Variable Lengths Codewords

Compressing video includes in part predicting what the next frame will be, as accurately as possible from the available data, or context. Then the (small) unpredictable element is what is sent in the bitstream, and this is combined with the prediction to give the result. The transition methods described here are designed to facilitate this process. On compression, the available context and codeword to compress are passed to the system. This then adds this information to its current distribution (which it is found performs well when it starts with no prejudice as the likely relationship between the context and the output codeword). The distribution output data for this context is calculated and variable length codewords assigned to the outcomes which have arisen. These variable length codewords are not calculated each time the system is queried as the cost/reward ratio makes it unviable, particularly as the codewords have to be recalculated on the player at the corresponding times they are calculated on the compressor. Instead, the codewords are recalculated from time to time. For example, every new frame, or every time the number of codewords has doubled. Recalculation every time an output word is entered for the first time is too costly in many cases, but this is aided by not using all the codeword space every time the codewords are recalculated. Codeword space at the long end is left available, and when new codewords are needed then next one is taken. As these codewords have never occurred up to this point, they are assumed to be rare, and so giving them long codewords is not a significant hindrance. When the codeword space is all used up, the codewords are recalculated. The minimum data rate for Huffman codewords is a very flat and wide minimum, so using the distribution from the codewords which have occurred so far is a good approximation to the optimal. Recalculating the codewords has to happen quickly in a real time system. The codewords are kept sorted in order of frequency, with the most frequent codewords first. In an example, the sorting is a mixture of bin sort using linked lists which is O(n) for the rare codewords which change order quite a lot, and bubble sort for the common codewords which by their nature do not change order by very much each time a new codeword is added. The codewords are calculated by keeping a record of the unused codeword space, and the proportion of the total remaining codewords the next data to encode takes. The shorted codeword when the new codeword does not exceed its correct proportion of the available codeword space is used. There are further constraints: in order to keep the codes as prefix codes and to allow spare space for new codewords, codewords never get shorter in length, and each codeword takes up an integer power of two of the total codeword space. This method creates the new codewords into a lookup table for quick encoding in O(n) where n is the number of sorted codewords.

Memory Management

To facilitate Java playback, all the memory used is allocated in one block at the start. As garbage collection algorithms on Java virtual machines are unpredictable, and many stop the system for periods which are long in comparison to the length of a video frame, the computer method or apparatus may use its own memory management system. This involves allocating enough memory for e.g. 2 destination codewords for each source codeword when it is first encountered. New transitions are added as and when they occur, and when the available space for them overflows, the old memory is ignored, and new memory of twice the size is allocated. Although up to half the memory may end up unused, the many rare transitions take almost no memory, and the system scales very well and makes no assumption about the distribution of transitions.

Give Compressed Codeword for this Uncompressed Codeword

Every time a codeword occurs in a transition for the second or subsequent time, its frequency is updated and it is re-sorted. When it occurs for the first time in this transition however, it must be defined. As many codewords occur multiple times in different transitions, the destination value is encoded as a variable length codeword each time it is used for the first time, and this variable length codeword is what is sent in the bitstream, preceded by a "new local codeword" header codeword. Similarly, when it occurs for the first time ever, it is encoded raw preceded by a "new global codeword" header codeword. These header codewords themselves are variable length and recalculated regularly, so they start off short as most codewords are new when a new environment is encountered, and they gradually lengthen as the transitions and concepts being encoded have been encountered before.

Video Compression (Cuts)

Cuts are compressed using spatial context from the same frame.

Cuts, RLE uniform shape, else assume independent and context=CUT_CW.

Cuts→editable, so needs efficient. First approximation at lower resolution e. g., 8×8.

Cuts-predict difference in mini-block codewords from previous one and uniform flag for current one.

Video Compression (Deltas)

The deltas can use temporal and spatial context.

Deltas shape-predict shape from uniformness of four neighbours and old shape.

Deltas-predict mini-block codeword differences from uniformness of this miniblock and old mini-block in time.

Data Rate Reductions

Various simple but effective data rate reduction methods are employed. Noise in the input signal can lead to isolated small changes over the image, whose loss would not be noticed. Isolated changed mini-blocks are generally left out from the bitstream, though if the mini-block is sufficiently different they can still be updated. In addition, small changes in colour in high colour areas are generally ignored as these are almost always caused by noise.

Multi-Level Gap Masks: 4×4, 16×16, 64×64

The bulk of the images are represented mbs and gaps between them. The gaps are spatially and temporally correlated. The spatial correlation is catered for by dividing the image into 4×4 blocks of mbs, representing 64 pixels each, with one bit per mini-block representing whether the mbs has changed on this frame. These 4×4 blocks are grouped into 4×4 blocks of these, with a set bit if any of the mbs it represents have changed. Similarly, these are grouped into 4×4 blocks, representing 128×128 pixels, which a set bit if any of the pixels has changed in the compressed representation. It turns out that trying to predict 16 bits at a time is too ambitious as the system does not have time to learn the correct distributions in a video of typical length. Predicting the masks 4×2 pixels at a time works well. The context for this is the corresponding gap masks from the two previous frames. The transition infrastructure above then gives efficient codewords for the gaps at various scales.

Multiple Data Rates at Once

One of the features of internet or intranet video distribution is that the audience can have a wide range of receiving and decoding equipment. In particular the connection speed may vary widely. In a system such as this designed for transmission across the internet, it helps to support multiple data rates. So the compression filters the image once, then resamples it to the appropriate sizes involving for example cropping so that averaging pixels to make the final image the correct size involves averaging pixels in rectangular blocks of fixed size. There is a sophisticated data rate targeting system which skips frames independently for each output bitstream. The compression is sufficiently fast on a typical modern PC of this time to create modem or midband videos with multiple target data rates. The video is split into files for easy access, and these files may typically be 10 seconds long, and may start with a key frame. The player can detect whether its pre-load is ahead or behind target and load the next chunk at either lower or higher data rate to make use of the available bandwidth. This is particularly important if the serving is from a limited system where multiple simultaneous viewers may wish to access the video at the same time, so the limit to transmission speed is caused by the server rather than the receiver. The small files will cache well on a typical internet setup, reducing server load if viewers are watching the video from the same ISP, office, or even the same computer at different times.

Key Frames

The video may be split into a number of files to allow easy access to parts of the video which are not the beginning. In these cases, the files may start with a key frame. A key frame contains all information required to start decompressing the bitstream from this point, including a cut-style video frame and information about the status of the Transition Tables, such as starting with completely blank tables.

Digital Rights Management (DRM)

DRM is an increasingly important component of a video solution, particularly now content is so readily accessible of the internet. Data typically included in DRM may be an expiry data for the video, a restricted set of URLs the video can be played from. Once the compressor itself is sold, the same video may be compressed twice with different DRM data in an attempt to crack the DRM by looking at the difference between the two files. The compression described here is designed to allow small changes to the initial state of the transition or global compression tables to effectively randomise the bitstream. By randomizing a few bits each time a video is compressed, the entire bitstream is randomized each time the video is compressed, making it much harder to detect differences in compressed data caused by changes to the information encoded in DRM.

Miscellaneous

The Y values for each pixel within a single super-block can also be approximated.

In many cases, there is only one or part of one object in a super-block. In these cases, a single Y value is often sufficient to approximate the entire super-block's pixel Y values, particularly when the context of neighbouring super-blocks is used to help reconstruct the image on decompression.

In many further cases, there are only two or parts of two objects in a super-block.

In these cases, a pair of Y values is often sufficient to approximate the entire superblock's Y values, particularly when the context of the neighbouring super-blocks is used to help reconstruct the image on decompression. In the cases where there are two Y values, a mask is used to show which of the two Y values is to be used for each pixel when reconstructing the original super-block. These masks can be compressed in a variety of ways, depending on their content, as it turns out that the distribution of masks is very skewed. In addition, masks often change by small amounts between frames, allowing the differences between masks on different frames to be compressed efficiently.

Improvements to image quality can be obtained by allowing masks with more than two Y values, although this increases the amount of information needed to specify which Y value to use.

Although this disclosure has been given with particular reference to video data, it will be appreciated that it could also be applied to other types of data such as audio data.

EXAMPLES

Figure 2:
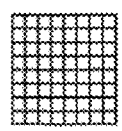
FIG. 2 shows a typical super-block of 8×8 pixels divided into 64 pixels.
Figure 3:
FIG. 3 shows a typical mini-block of 2×2 pixels divided into 4 pixels.
Figure 4:
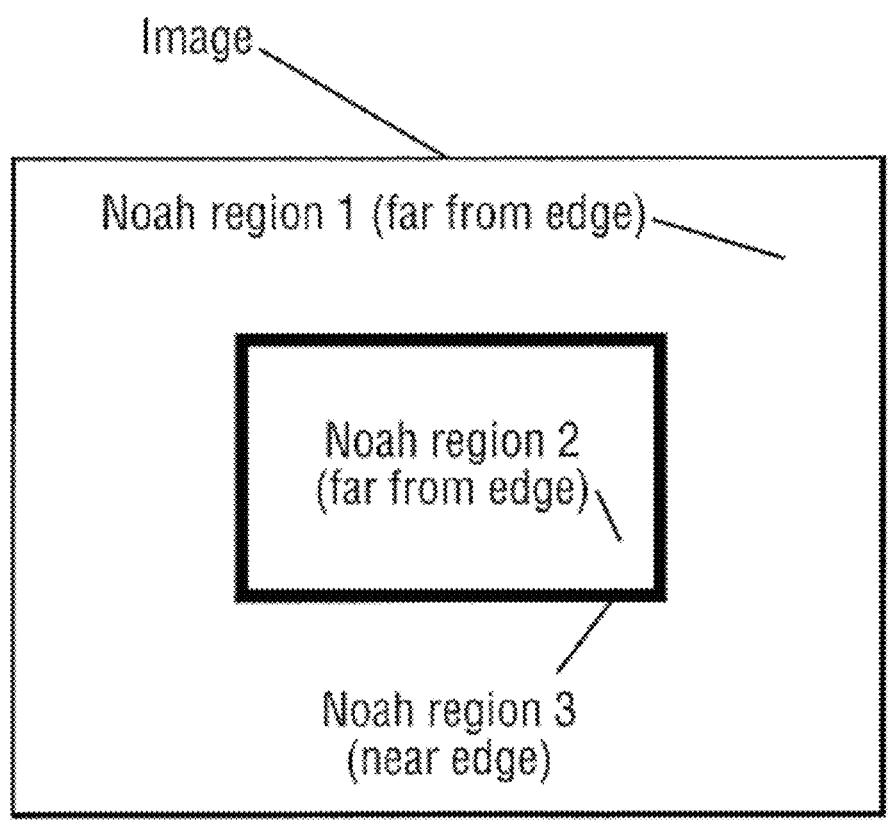
FIG. 4 shows an example image containing two Noah regions and a Noah edge.
Figure 5:
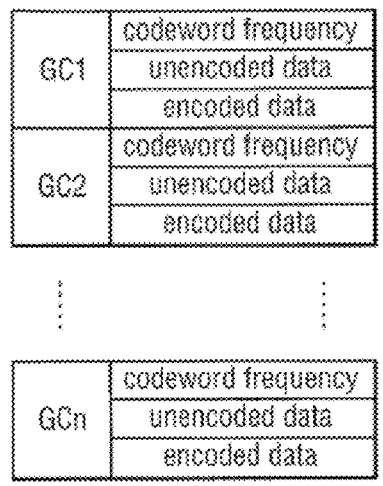
FIG. 5 shows an example of global accessible context for Transition Tables.
Figure 6:
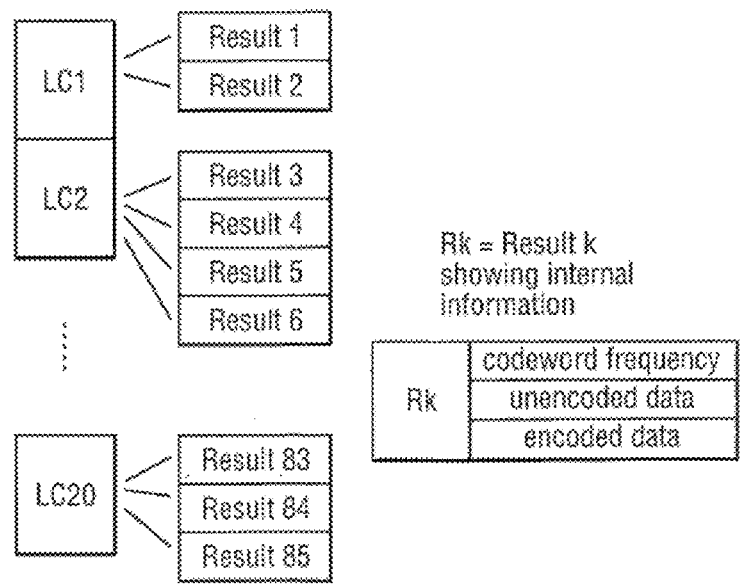
FIG. 6 shows an example of Transition Tables with local context (e.g. LC1, etc.) and corresponding resulting values which have been predicted so far.
Figure 7:
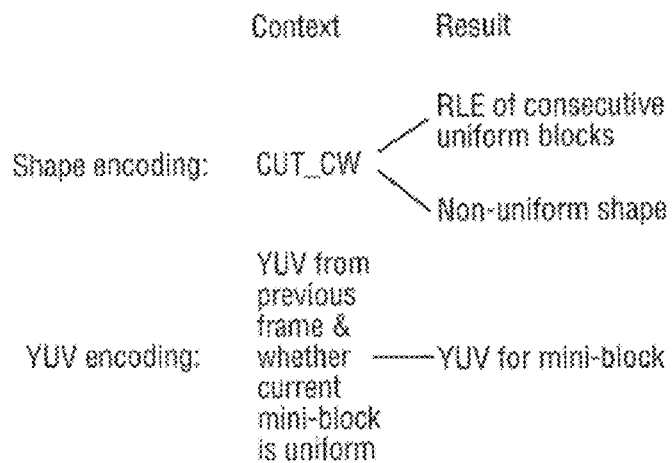
FIG. 7 shows an example of typical context information for cuts.
Figure 8:
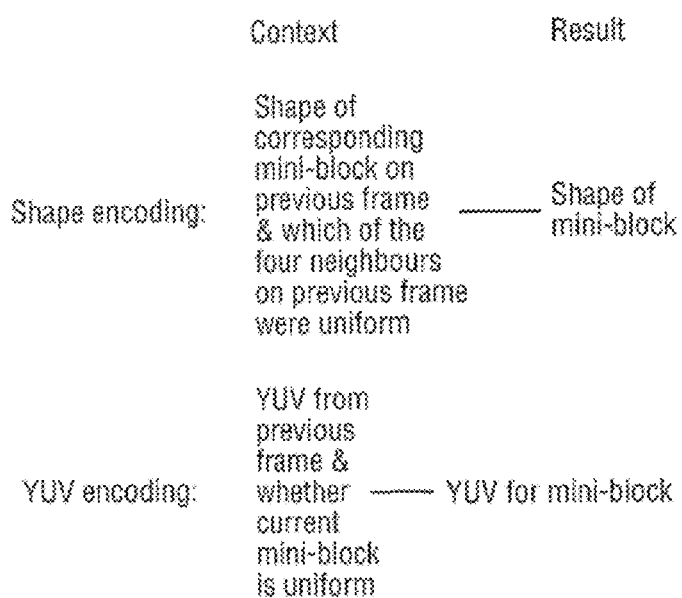
FIG. 8 shows an example of typical context information for delta frames.
Figure 9:
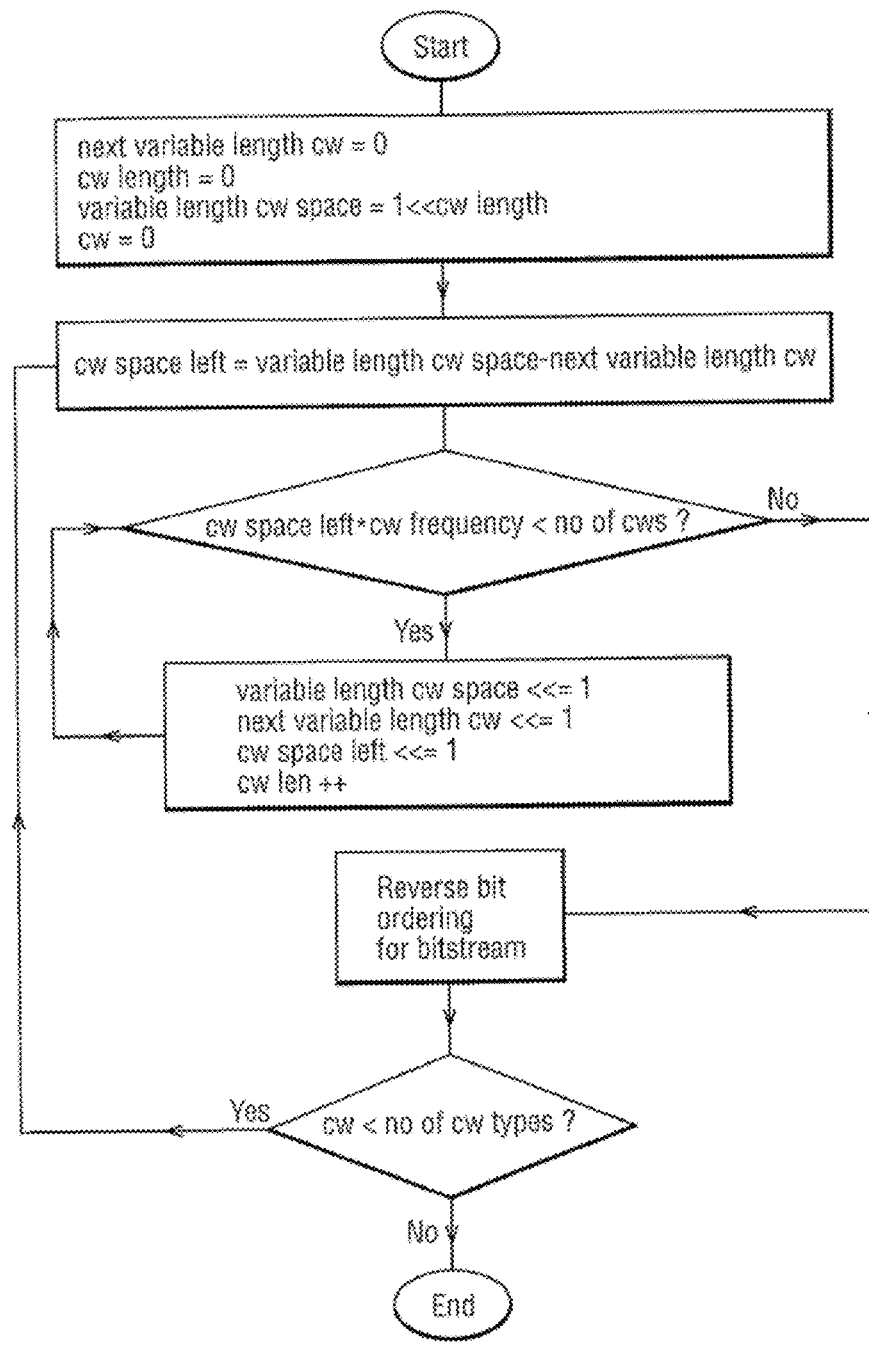
FIG. 9 is a flowchart showing how variable length codewords may be generated from a list of codewords sorted by frequency.

Video frames of typically 384×288, 376×280, 320×240, 192×144, 160×120 or 128×96 pixels (see e.g. FIG. 1) are divided into pixel blocks, typically 8×8 pixels in size (see e.g. FIG. 2), and also into pixel blocks, typically 2×2 pixels in size, called mini-blocks (see e.g. FIG. 3). In addition, the video frames are divided into Noah regions (see e.g. FIG. 4), indicating how complex an area of the image is.

In one implementation, each super-block is divided into regions, each region in each super-block approximating the corresponding pixels in the original image and containing the following information:

1 Y values (typically 8 bits)
1 U value (typically 8 bits)
1 V value (typically 8 bits)
64 bits of mask specifying which YUV value to use when reconstructing this super-block.

In this implementation, each mini-block contains the following information:

2 Y values (typically 8 bits each)
1 U value (typically 8 bits)
1 V value (typically 8 bits)
4 bits of mask specifying which Y value to use when reconstructing this mini-block.

Temporal Gaps

If more latency is acceptable, temporal gaps rather than spatial gaps turn out to be an efficient representation. This involves coding each changed mini-block with a codeword indicating the next time (if any) in which it changes.

Interpolation Between Uniform Super-Blocks

Where uniform super-blocks neighbour each other, bilinear interpolation between the Y, U and V values used to represent each block is used to find the Y, U and V values to use for each pixel on playback.

In an example, there is provided a method of processing digital video information for transmission or storage after compression, said method comprising: reading digital data representing individual picture elements (pixels) of a video frame as a series of binary coded words; segmenting the image into regions of locally relatively similar pixels and locally relatively distinct pixels; having a mechanism for learning how contextual information relates to codewords requiring compression and encoding such codewords in a way which is efficient both computationally and in terms of compression rate of the encoded codewords and which dynamically varies to adjust as the relationship between the context and the codewords requiring compression changes and which is computationally efficient to decompress; establishing a reduced number of possible luminance values for each block of pixels (typically no more than four); encoding to derive from the words representing individual pixels further words describing blocks or groups of pixels each described as a single derived word which at least includes a representation of the luminance of a block component of at least eight by eight individual pixels (super-block); establishing a reduced number of possible luminance values for each block of pixels (typically no more than four); encoding to derive from the words representing individual pixels further words describing blocks or groups of pixels each described as a single derived word which at least includes a representation of the luminance of a block component of typically two by two individual pixels (mini-block); establishing a reduced number of possible luminance values for each block of pixels (typically one or two); providing a series of changeable stored masks as a mechanism for indicating which of the possible luminance values are to be used in determining the appropriate luminance value of each pixel for display; comparing and evaluating the words representing corresponding portions of one frame with another frame or frames in a predetermined sequential order of the elements making up the groups to detect differences and hence changes; identifying any of the masks which require updating to reflect such differences and choosing a fresh mask as the most appropriate to represent such differences and storing the fresh mask or masks for transmission or storage; using context which will be available at the time of decompression to encode the masks, the changes in Y values, U values, and V values, and the spatial or temporal gaps between changed blocks, combined with the efficient encoding scheme, to give an efficient compressed real time representation of the video; using variable length codewords to represent the result of transitions in a way which is nearly optimal from a compression point of view, and computationally very efficient to calculate.

There is provided a method of compressing digital data comprising the steps of: (i) reading digital data as series of binary coded words representing a context and a codeword to be compressed; (ii) calculating distribution output data for the input data and assigning variable length codewords to the result; and (iii) periodically recalculating the codewords in accordance with a predetermined schedule, in order to continuously update the codewords and their lengths.

The method may be one in which the codewords are recalculated each time the number of codewords has doubled. The method may be one in which the codewords are recalculated for every new frame of data. The method may be one in which some codeword space is reserved at each recalculation so as to allow successive new codewords to be assigned for data of lower frequency.

There is provided a method of processing digital video information so as to compress it for transmission or storage, said method comprising: reading digital data representing individual picture elements (pixels) of a video frame as a series of binary coded words; segmenting the image into regions of locally relatively similar pixels and locally relatively distinct pixels; establishing a reduced number of possible luminance values for each block of pixels (typically no more than four); carrying out an encoding process so as to derive from the words representing individual pixels, further words describing blocks or groups of pixels each described as a single derived word which at least includes a representation of the luminance of a block component of at least eight by eight individual pixels (super-block); establishing a reduced number of possible luminance values for each smaller block of pixels (typically no more than four); carrying out an encoding process so as to derive from the words representing individual pixels, further words describing blocks or groups of pixels each described as a single derived word which at least includes a representation of the luminance of a block component of typically two by two individual pixels (mini-block); establishing a reduced number of possible luminance values for each block of pixels (typically one or two); providing a series of changeable stored masks to indicate which of the possible luminance values are to be used in determining the appropriate luminance value of each pixel for display; comparing and evaluating the words representing corresponding portions of one frame with another frame or frames in a predetermined sequential order of the elements making up the groups to detect differences and hence changes; identifying any of the masks which require updating to reflect such differences and choosing a fresh mask as the most appropriate to represent such differences and storing the fresh mask or mask for transmission or storage; using context which will be available the time of decompression to encode the masks, the changes in Y values (luminance), U values (chrominance), and V values (chrominance) and the spatial or temporal gaps between changed blocks, combined with the efficient encoding scheme, to give an efficient compressed real time representation of the video; and using variable length codewords to represent the result of transitions.

The method may be one in which the method further comprises an adaptive learning process for deriving a relationship between contextual information and codewords requiring compression, and a process for dynamically adjusting the relationship so as to optimise the compression rate and the efficiency of decompression.

There is provided a method of compressing digital data for storage or transmission, comprising the steps of:
(i) reading inputted digital data as series of binary coded words representing a context and an input codeword to be compressed;
(ii) calculating distribution output data for the inputted digital data and generating variable length prefix codewords for each combination of context and input codeword, and generating a respective sorted Transition Table of variable length prefix codewords for each context, in a manner in which codeword space at the long end is left available to represent new input codewords, which have not yet occurred with corresponding contexts, as they occur; and
(iii) repeating the process of step (ii) from time to time;
(iv) whereby the inputted digital data can be subsequently replayed by recalculating the sorted Transition Table of local codewords at corresponding times in the inputted digital data.

The method may be one in which the codewords are recalculated for every new frame of data. The method may be one in which some codeword space is reserved at each recalculation so as to allow successive new codewords to be assigned for data of lower frequency. The method may be one in which some codeword space is reserved at each recalculation so as to allow successive new codewords to be assigned for data of lower frequency.

There is provided a method of compressing digital data for storage or transmission, comprising the steps of:
(i) reading digital data as a series of binary coded words representing a context and a codeword to be compressed;
(ii) calculating distribution output data for the input data and generating variable length prefix codewords for each combination of context and input codeword so as to form a respective sorted Transition Table of local codewords for each context, in a manner which reserves logical codeword space at the long end to represent any new input codewords, which have not yet occurred with that context, as they occur for the first time; and
(iii) repeating the process of step (ii) from time to time;
(iv) whereby the input data can be subsequently replayed by recalculating the codeword tables at corresponding times in the input data, wherein the codewords are recalculated each time the number of codewords has doubled.

There is provided a method of compressing digital data for storage or transmission, comprising the steps of:
(i) reading digital data as a series of binary coded words representing a context and a codeword to be compressed;
(ii) calculating distribution output data for the input data and generating variable length prefix codewords for each combination of context and input codeword so as to form a respective sorted Transition Table of local codewords for each context, in a manner which reserves logical codeword space at the long end to represent any new input codewords, which have not yet occurred with that context, as they occur for the first time; and
(iii) repeating the process of step (ii) from time to time;
(iv) whereby the input data can be subsequently replayed by recalculating the codeword tables at corresponding times in the input data, wherein the method further comprises an adaptive learning process for deriving a relationship between contextual information and codewords requiring compression, and a process for dynamically adjusting the relationship so as to optimize the compression rate and the efficiency of decompression.

A Method of Compressing Video Data and a Media Player for Implementing the Method This section of this document relates to disclosures made in WO2007077447A2 and U.S. Pat. No. 8,660,181B2.

There is provided a method of receiving video data comprising the steps of: receiving at least one chunk of video data comprising a number of sequential key video frames where the number is at least two and, constructing at least one delta frame between a nearest preceding key frame and a nearest subsequent key frame from data contained in the either or each of the nearest preceding and subsequent frames.

Visual recordings of moving things are generally made up of sequences of successive images. Each such image represents a scene at a different time or range of times. This disclosure relates to such sequences of images such as are found, for example, in video, film and animation.

Video takes a large amount of memory, even when compressed. The result is that video is generally stored remotely from the main memory of the computer. In traditional video editing systems, this would be on hard discs or removable disc storage, which are generally fast enough to access the video at full quality and frame rate. Some people would like to access and edit video files content remotely, over the internet, in real time. This disclosure relates to the applications of video editing (important as much video content on the web will have been edited to some extent), video streaming, and video on demand.

At present any media player editor implementing a method of transferring video data across the internet in real time suffers the technical problems that: (a) the internet connection speed available to internet users is, from moment to moment, variable and unpredictable; and (b) that the central processing unit (CPU) speed available to internet users is from moment to moment variable and unpredictable.

For the application of video editing, consistent image quality is very preferable, because many editing decisions are based on aspects of the image, for example, whether the image was taken in focus or out.

It is an object of the present disclosure to alleviate at least some of the aforementioned technical problems. Accordingly this disclosure provides a method of receiving video data comprising the steps of: receiving at least one chunk of video data comprising a number (n) of sequential key video frames where the number (n) is at least two and, constructing at least one delta frame between a nearest preceding key frame and a nearest subsequent key frame from data contained in either, or each, of the nearest preceding and subsequent frames.

Preferably the delta frame is composed of a plurality of component blocks or pixels and each component of the delta frame is constructed according to data indicating it is one of: the same as the corresponding component in the nearest preceding key frame, or the same as the corresponding component in the nearest subsequent key frame, or a new value compressed using some or all of the spatial compression of the delta frame and information from the nearest preceding and subsequent frames. After the step of construction, the delta frame may be treated as a key frame for the construction of one or more further delta frames. Delta frames may continue to be constructed in a chunk until either: a sufficiently good predetermined image playback quality criterion is met or the time constraints of playing the video in real time require the frames to be displayed. The number of key frames in a chunk may be in the range from n=3 to n=10.

Although the method may have other applications, it is particularly advantageous when the video data is downloaded across the internet. In such a case it is convenient to download each key frame in a separate download slot, the number of said download slots equating to the maximum number of download slots supportable by the internet connection at any moment in time. Preferably each slot is implemented in a separate thread. Where it is desired to subsequently edit the video it is preferable that each frame, particularly the key frames, are cached upon first viewing to enable subsequent video editing.

According to another aspect of this disclosure, there is provided a media player arranged to implement the method which preferably comprises a receiver to receive chunks of video data including at least two key frames, and a processor adapted to construct a delta frame sequentially between a nearest preceding key frame and a nearest subsequent key frame. Preferably, a memory is also provided for caching frames as they are first viewed to reduce the subsequent requirements for downloading.

According to a third aspect of this disclosure, there is provided a method of compressing video data so that the video can be streamed across a limited bandwidth connection with no loss of quality on displayed frames which entails storing video frames at various temporal resolutions which can be accessed in a pre-defined order, stopping at any point. Thus multiple simultaneous internet accesses can ensure a fairly stable frame rate over a connection by (within the resolution of the multitasking nature of the machine) simultaneously loading the first or subsequent temporal resolution groups of frames from each of a number of non-intersecting subsets of consecutive video frames until either all the frames in the group are downloaded, or there would probably not be time to download the group, in which case a new group is started.

This disclosure includes a method for enabling accurate editing decisions to be made over a wide range of internet connection speeds, as well as video playback which uses available bandwidth efficiently to give a better experience to users with higher bandwidth. Traditional systems have a constant frame rate, but the present disclosure relates to improving quality by adding extra delta frame data, where bandwidth allows.

A source which contains images making up a video, film, animation or other moving picture is available for the delivery of video over the internet. Images (2, 4, 6 . . . ) in the source are digitised and labelled with frame numbers (starting from zero) where later times correspond to bigger frame numbers and consecutive frames have consecutive frame numbers. The video also has audio content, which is split into sections.

The video frames are split into chunks as follows: A value of n is chosen to be a small integer 0≤n. In one implementation, n is chosen to be 5. A chunk is a set of consecutive frames of length 2^n. All frames appear in at least one chunk, and the end of each chunk is always followed immediately by the beginning of another chunk.

Figure 10:
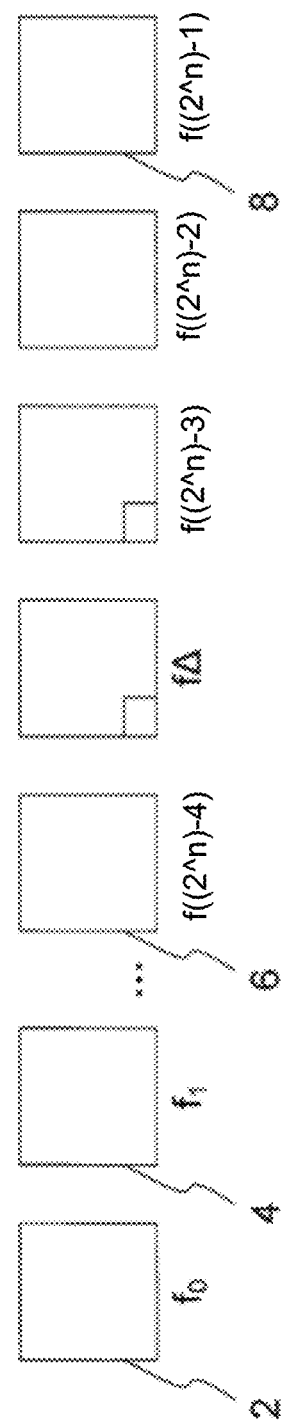
FIG. 10 is a schematic diagram of a sequence of video frames.

"f" represent the frame number in the chunk, where the earliest frame (2) in each chunk has f=0, and the last (8) has f=(2^n)−1 (see e.g. FIG. 10).

Figure 11:
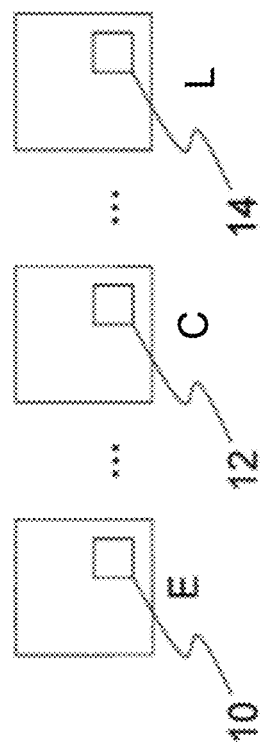
FIG. 11 is a schematic diagram illustrating an example of a construction of a delta frame.

All f=0 frames in a chunk are compressed as key frames— that is they can be recreated without using data from any other frames. All frames equidistant in time between previously compressed frames are compressed as delta frames recursively as follows: Let frame C (see e.g. FIG. 11) be the delta frame being compressed. Then there is a nearest key frame earlier than this frame, and a nearest key frame later than this frame, which have already been compressed. Let us call them E and L respectively. Each frame is converted into a spatially compressed representation, in one implementation comprising rectangular blocks of various sizes with four Y or UV values representing the four corner values of each block in the luminance and chrominance respectively.

Frame C is compressed as a delta frame using information from frames E and L (which are known to the decompressor), as well as information as it becomes available about frame C.

In one implementation, the delta frame is reconstructed as follows:

Each component (12) of the image (pixel or block) is represented as either: the same as the corresponding component (10) in frame E; or the same as the corresponding component (14) in frame L; or a new value compressed using some or all of spatial compression of frame C, and information from frames E and L.

Compressing the video data in this way allows the second part of the disclosure to function. This is described next. When transferring data across the internet, using the HTTP protocol used by web browsers, the described compression has advantages, for example enabling access through many firewalls. The two significant factors relevant to this disclosure are latency and bandwidth. The latency here is the time taken between asking for the data and it starting to arrive. The bandwidth here is the speed at which data arrives once it has started arriving. For a typical domestic broadband connection, the latency can be expected to be between 20 ms and 1 s, and the bandwidth can be expected to be between 256 kb/s and 8 Mb/s.

Figure 12:
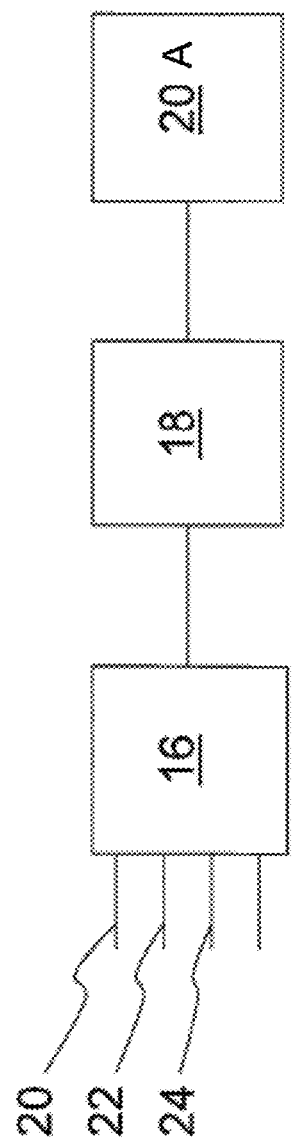
FIG. 12 is a schematic diagram of an example of a media player.

The disclosure involves one compression step for all supported bandwidths of connection, so the player (e.g. 16, FIG. 12) has to determine the data to request which gives the best playback experience. This may be done as follows:

The player has a number of download slots (20, 22, 24 . . . ) for performing overlapping downloads, each running effectively simultaneously with the others. At any time, any of these may be blocked by waiting for the latency or by lost packets. Each download slot is used to download a key frame, and then subsequent files (if there is time) at each successive granularity. When all files pertaining to a particular section are downloaded, or when there would not be time to download a section before it is needed for decompression by the processor (18), the download slot is applied to the next unaccounted for key frame.

In one implementation of the disclosure, each slot is implemented in a separate thread.

A fast link results in all frames being downloaded, but slower links download a variable frame rate at e.g. 1, ½, ¼, ⅛ etc of the frame rate of the original source video for each chunk. This way the video can play back with in real time at full quality, possibly with some sections of the video at lower frame rate.

In a further implementation, as used for video editing, frames downloaded in this way are cached in a memory (20A) when they are first seen, so that on subsequent accesses, only the finer granularity videos need be downloaded.

The number of slots depends on the latency and the bandwidth and the size of each file, but is chosen to be the smallest number which ensures the internet connection is fully busy substantially all of the time.

In one implementation, when choosing what order to download or access the data in, the audio is given highest priority (with earlier audio having priority over later audio), then the key frames, and then the delta frames (within each chunk) in the order required for decompression with the earliest first.

There is provided a method of receiving video data comprising the steps of: receiving at least one chunk of video data comprising a number (n) of sequential key video frames where the number (n) is at least two and, constructing at least one delta frame (C) between a nearest preceding key frame (E) and a nearest subsequent key frame (L) from data contained in the either or each of the nearest preceding and subsequent frames.

The method may be one wherein the delta frame (C) is composed of a plurality of component blocks or pixels and each component of the delta frame is constructed according to data indicating it is one of:
  (a) the same as the corresponding component in the nearest preceding key frame (E), or
  (b) the same as the corresponding component in the nearest subsequent key frame (L), or
  (c) a new value compressed using some or all of the spatial compression of frame C, and information from the nearest preceding and subsequent frames.

The method may be one wherein after the step of construction, the delta frame is treated as a key frame for the construction of one or more delta frames.

The method may be one wherein delta frames continue to be constructed in a chunk until either: a sufficiently good predetermined image playback quality criterion is met or the time constraints of playing the video in real time require the frames to be displayed.

The method may be one wherein the number of key frames is in the range from n=3 to n=10.

The method may be one comprising downloading the video data across the internet.

The method may be one comprising downloading each key frame in a separate download slot, the number of said download slots equating to the maximum number of download slots supportable by the internet connection at any moment in time.

The method may be one wherein each slot is implemented in a separate thread.

The method may be one wherein each frame is cached upon first viewing to enable subsequent video editing.

The method may be one wherein the key frames are cached.

There is provided a media player configured to implement the method according to any one of the above statements.

The media player may be one having: a receiver to receive chunks of video data including at least two key frames, a processor adapted to construct a delta frame sequentially between a nearest preceding key frame and a nearest subsequent key frame.

There is provided a method of compressing video data so that the video can be streamed across a limited bandwidth connection with no loss of quality on displayed frames, the method comprising storing video frames at various temporal resolutions which can be accessed in a pre-defined order, stopping at any point.

The method may be one where multiple simultaneous internet accesses can ensure a fairly stable frame rate over a connection by simultaneously loading the first or subsequent temporal resolution groups of frames from each of a number of non-intersecting subsets of consecutive video frames until either all the frames in the group are downloaded, or until a predetermined time has elapsed, and then in starting a new group.

There is provided a method of compressing video data with no loss of frame image quality on the displayed frames, by varying the frame rate relative to the original source video, the method comprising the steps of:
  receiving at least two chunks of uncompressed video data, each chunk comprising at least two sequential video frames and,
  compressing at least one frame in each chunk as a key frame, for reconstruction without the need for data from any other frames,
  compressing at least one intermediate frame as a delta frame between a nearest preceding key frame and a nearest subsequent key frame from data contained in either or each of the nearest preceding and subsequent frames,
  wherein further intermediate frames are compressed as further delta frames within the same chunk, by treating any previously compressed delta frame as a key frame for constructing said further delta frames, and
  storing the compressed video frames at various mutually exclusive temporal resolutions, which are accessed in a pre-defined order, in use, starting with key frames, and followed by each successive granularity of delta frames, stopping at any point; and
  whereby the frame rate is progressively increased as more intermediate data is accessed.

The method may be one wherein the delta frame is composed of a plurality of component blocks or pixels and each component of the delta frame is constructed according to data indicating it is one of:
  (a) the same as the corresponding component in the nearest preceding key frame, or
  (b) the same as the corresponding component in the nearest subsequent key frame, or
  (c) a new value compressed using some or all of the spatial compression of frame, and information from the nearest preceding and subsequent frames.

The method may be one wherein after the step of construction, the delta frame is treated as a key frame for the construction of one or more delta frames.

The method may be one wherein delta frames continue to be constructed in a chunk until either: a predetermined image playback quality criterion, including a frame rate required by an end-user, is met or the time constraints of playing the video in real time require the frame to be displayed.

The method may be one wherein the number of frames in a chunk is $2^n$, and n is in the range from n=3 to n=10.

The method may be one comprising downloading the video data across the internet.

The method may be one comprising downloading each key frame in a separate download slot, the number of said download slots equating to the minimum number to fully utilize the internet connection.

The method may be one wherein each slot is implemented in a separate thread.

The method may be one wherein each frame is cached upon first viewing to enable subsequent video editing.

The method may be one wherein the key frames are cached.

There is provided a method of processing video data comprising the steps of:

receiving at least one chunk of video data comprising $2^n$ frames and one key video frame, and the next key video frame;

constructing a delta frame (C) equidistant between a nearest preceding key frame (E) and a nearest subsequent key frame (L) from data that includes data contained in either or each of the nearest preceding and subsequent key frames;

constructing additional delta frames equidistant between a nearest preceding key frame and a nearest subsequent key frame from data that includes data contained in either or each of the nearest preceding and subsequent key frames, wherein at least one of the nearest preceding key frame or the nearest subsequent key frame is any previously constructed delta frame; storing the additional delta frames at various mutually exclusive temporal resolutions, which are accessible in a predefined order, in use, starting with the key frames, and followed by each successive granularity of delta frames, stopping at any point; and continuing to construct the additional delta frames in a chunk until either a predetermined image playback quality criterion, including a user selected frame rate, is achieved, or a time constraint associated with playing of the chunk of video data in real time requires the frames to be displayed.

The method may be one further comprising downloading the at least one chunk of video data at a frame rate that is less than an original frame rate associated with the received video data.

The method may be one further comprising determining a speed associated with the receipt of the at least one image chunk, and only displaying a plurality of constructed frames in accordance with the time constraint and the determined speed.

A Method for Enabling Efficient Navigation of Video

This section of this document relates to disclosures made in EP1738365B1, WO2005101408A1 and U.S. Pat. No. 8,255,802B2.

A method is provided of facilitating navigation of a sequence of source images, the method using tokens representing each source image which are scaled versions of each source image and which are arranged adjacently on a display device in a continuous band of token images so that a pointer device can point to a token and the identity of the corresponding image is available for further processing.

Visual recordings of moving things are generally made up of sequences of successive images. Each such image represents a scene at a different time or range of times. This disclosure relates to recordings including sequences of images such as are found, for example, in video, film and animation.

The common video standard PAL used in Europe comprises 25 frames per second. This implies that an hour of video will include nearly 100,000 frames. Other video formats, such as the NTSC standard used in the USA and Japan, have similar number of frames per hour as PAL.

A requirement for a human operator to locate accurately and to access reliably a particular frame from within many can arise. One application where this requirement arises is video editing. In this case, the need may not just be for accurate access on the scale of individual frames, but also easy access to different scenes many frames apart. In other words, there is a need to be able to access video frames over a range of time scales which may be up to five or six orders of magnitude apart.

The disclosure provided herein includes a method for enabling efficient access to video content over a range of temporal scales.

Assume there is a source which contains images making up a video, film, animation or other moving picture. Images in the source are digitised and labelled with frame numbers where later times correspond to bigger frame numbers and consecutive frames have consecutive frame numbers.

Each image is given an associated token image, which may be a copy of the source image. In practice, these source images may be too big to fit many on a display device such as a computer screen, a smartphone screen, or a tablet screen, at the same time. In this case, the token image will be a reduced size version of the original image. The token images are small enough that a number of token images can be displayed on the display device at the same time. In an application according to this disclosure, this size reduction is achieved by averaging a number of pixels in the source image to give each corresponding pixel in the smaller token images. There are many tools available to achieve this. In this application, there are typically between ten and fifty token images visible at a time.

Figure 13:
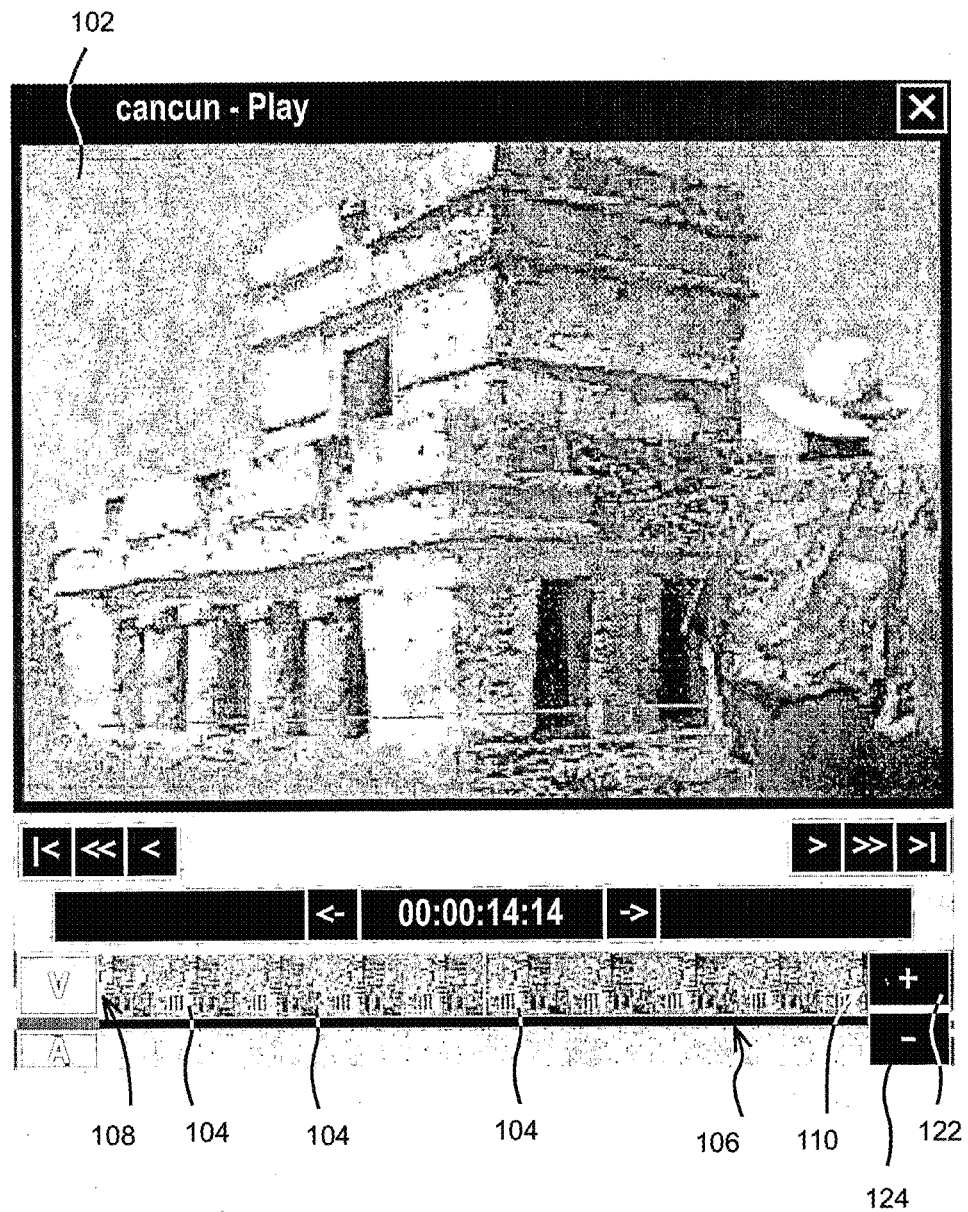
FIG. 13 is an example of a computer display providing a method of enabling efficient navigation of video.

Referring to FIG. 13, in an example, there is provided a computer display whose resolution is 1024×768 pixels, and the images (102) from the source video are digitised at 320×240 pixels, and the tokens (104) representing the source images are 32×24 pixels. In one commercial application, the token images have the same aspect ratio as the original images.

The token images are then combined consecutively with no gaps between them in a continuous band (106) which is preferably horizontal. This band is then displayed on the computer screen, although if the source is more than a few images in length, the band will be wider than the available display area, and only a subset of it will be visible at any one time.

The video is navigated to frame accuracy by using a pointing device, such as a mouse, which is pointed at a particular token within the horizontal band. This causes the original image corresponding to this token to be selected. Any appropriate action can then be carried out on the selected frame. For example, the selected frame can then be displayed. In another example, the time code of the selected frame can be passed on for further processing. In a further example, the image pixels of the selected frame can be passed on for further processing.

In a further refinement, in one implementation, when the pointing device points near to the edge (108) or (110) of the displayed subset of the horizontal band, the band automatically and smoothly scrolls so that the token originally being pointed to moves towards the centre of the displayed range. This allows access beyond the original displayed area of the horizontal band.

Figure 14:
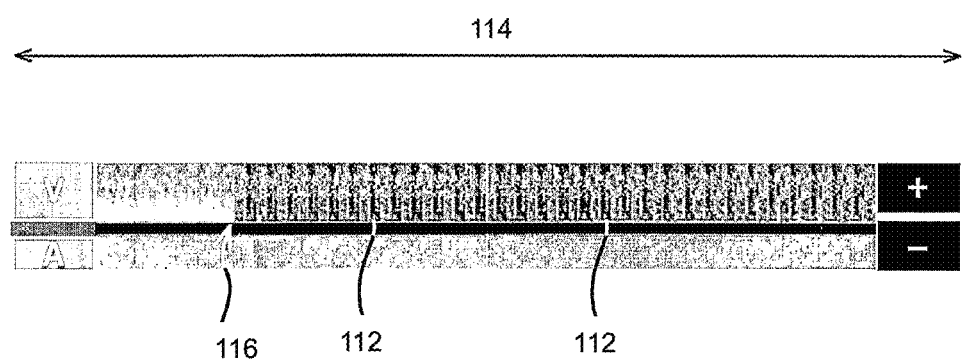
FIG. 14 is an example of a sequence of source image frames processed to provide a method of enabling efficient navigation of video.

The above description therefore shows how frame accurate access is simple for short clips. The same principle can be extended to longer sequences of source image frames, as illustrated for example in FIG. 14.

Each token is reduced in size, but this time only horizontally. This reduction leaves each new token (112) at least one pixel wide. Where the reduction in size is by a factor of x, the resulting token is called an x-token within this document. So, for example, 2-tokens are half the width of tokens, but the same height. The x-tokens are then displayed adjacent to each other in the same order as the original image frames to create a horizontal band as with the tokens, but with the difference that more of these x-tokens fit in the same space than the corresponding tokens, by a factor of x.

Navigation proceeds as before, the difference being that each x-token is narrower than before, so that more of them are visible than with the original tokens, and a smaller pointer movement is needed to achieve the same movement in frames.

In one such implementation, the space (114) allocated to the horizontal band for tokens and x-tokens is 320 pixels. The tokens (104) are 32×24 pixels, and the x-tokens (112) are created in a variety of sizes down to 1×24 pixels. In the 32-token case, the horizontal band corresponds to 320 frames of video, compared with ten frames for the token image. This range of 320 frames can be navigated successfully with the pointer.

This design is a significant departure from existing commercial systems where instead of a horizontal band made of all the x-tokens, the corresponding band may contain one token in every x. In this disclosure, subject to the colour resolution of the display device, every pixel in every image contributes some information to each horizontal band. Even with x-tokens only one pixel wide, the position of any cut (116) on the source is visible to frame accuracy, as are sudden changes in the video content.

Figure 15:
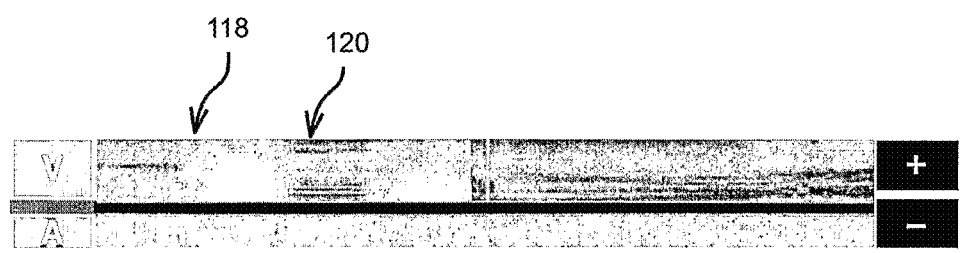
FIG. 15 is an example of additional horizontal reductions, in a method of enabling efficient navigation of video.

The x-tokens are fine for navigating short clips, but to navigate longer sources, further horizontal reductions are required, see e.g. FIG. 15. In the case where each horizontal pixel on the horizontal display band represents y frames, the horizontal band made of 1 pixel wide x-tokens is squashed horizontally by a factor of y. If y is an integer, this is achieved by combining y adjacent non-intersecting sets of 1 pixel wide x-tokens (by for example averaging) to make a y-token one pixel wide and the same height as the tokens. Significant changes of video content (118, 120) can still be identified, even for quite large values of y.

In one implementation, values of x and y used are powers of two, and the resulting horizontal display bands represent all scales from 0 frames to 5120 frames. Larger values of y will be appropriate for longer videos.

In the x-tokens and y-tokens, the values of x and y need not be integers, although appropriate weightings between vertical lines within image frames and between image frames will then be needed if image artefacts are to be avoided.

In one implementation, the tokens, x-tokens and y-tokens are created in advance of their use for editing in order to facilitate rapid access to the horizontal bands. The x-tokens and y-tokens are created at multiple resolutions. Switching between horizontal bands representing different scales is facilitated by zoom in and zoom out buttons (122, 124) which move through the range of horizontal contractions available.

There is provided a method of facilitating navigation of a sequence of source images, the method using tokens representing each source image which are scaled versions of each source image and which are arranged adjacently on a display device in a continuous band of token images so that a pointer device can point to a token and the identity of the corresponding image is available for further processing.

The method may be one where one or more new bands can be constructed by squashing the band in the longitudinal direction by one or more factors in each case squashing by a factor which is no wider than the pixel width of the individual tokens making up the band.

The method may be one where neighbouring tokens are first combined to make new tokens corresponding to multiple frames and these new tokens are arranged next to each other in a band. The method may be one where the widths and heights of different tokens differ. The method may be one in which the band is arranged horizontally on a display device together with a normal video display generated from the source images. The method may be one which is so arranged that, when the pointer device points to a token near to the edge of the displayed subset of the continuous band, the band automatically scrolls, so that the token moves towards the centre of the displayed range, thereby allowing access to a region beyond the original displayed area.

FURTHER DISCLOSURES

WO2017021688A1 discloses a method of encoding a series of frames in a video or media, including receiving a first key frame, receiving subsequent chunks of frames including at least one key frame, dividing each frame into a plurality of blocks, subdividing a first block of the plurality of blocks into a plurality of pixel groups, averaging the pixels in each pixel group to generate a single value, creating a first mini-block wherein each element of said first mini block corresponds with a pixel group of the corresponding first block and contains said single value, repeating for each block of each frame of the chunk, comparing a first of said plurality of mini blocks of a first frame with mini blocks of a second frame, where said second frame mini blocks are not necessarily aligned to mini blocks in the first frame, until a best match is achieved.

PCT application number PCT/GB2018/050013 discloses a method for encoding and decoding a video stream comprising dividing the video stream into a first Key frame, and subsequent chunks each comprising $2^n$ frames, each chunk including a Key frame and $2^{n-1}$ Delta ($D^x$) frames, where x is a positive integer and denotes the level of the Delta frame, and where $2^{x-1}$ denotes the number of Delta frames at that level in the chunk; the method including the step of constructing $D^x$ level frames from adjacent Earlier and Later $D^y$ frames, (where y<x and where for y=0, $D^y$ is a Key frame), for all frames in a chunk where x>0; wherein the constructing step includes: dividing the frame into Motion Regions representing groups of pixels; determining a pixel group in an Earlier (E: $D^y$) and later (L: $D^y$) frame that is a best match for a pixel group in a Motion Region of a Current (C: $D^x$) frame; determining motion vectors for the best matches for Motion Regions, or by intra-frame compression of frame C. The method is characterised by eliminating unnecessary information when building a bitstream such that as x increases, motion vector and other data relating to a combination of $D^x$ frames (more numerous than the $D^{x-1}$ frames) is represented by a quantity of data in the bitstream that, for a typical video, increases at a much lower rate than the quantity of frames in $D^x$ compared to the quantity of frames in $D^{x-1}$.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer-implemented method of providing video clip playback, the method including the steps of:
   (i) receiving a video feed;
   (ii) converting the video feed into a compressed format structure, the compressed format structure including a hierarchy of more than two levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
   (iii) uploading the compressed format structure to a first server;
   (iv) providing the compressed format structure in chunks to a video editor, wherein the video editor is operable to generate an electronic edit decision list (EDL), in which the video editor is operable to provide editing accurate to a single frame;
   (v) receiving the electronic edit decision list from the video editor including editing accurate to a single frame, which defines how to manipulate the compressed format structure;
   (vi) saving the electronic edit decision list to the first server, or to a second server;
   (vii) receiving a request to provide in a web browser executing on a user terminal a video clip playback corresponding to a video clip defined by the compressed format structure and the electronic edit decision list;
   (viii) sending to the web browser code executable in the web browser to provide the video clip playback corresponding to the video clip defined by the compressed format structure stored on the first server and the electronic edit decision list saved on the first server or on the second server, and
   (ix) responding to requests from the code when executing in the web browser, to provide content corresponding to the compressed format structure stored on the first server, in accordance with the electronic edit decision list saved on the first server or on the second server, to the web browser, to provide the video clip playback.

2. The method of claim 1, in which in the EDL, clip in and clip out points have been selected to single frame accuracy.

3. The method of claim 1, in which in the EDL, a video clip with a desired start frame and with a desired end frame has been selected, to single frame accuracy.

4. The method of claim 1, in which the video editor is operable to request higher temporal resolution groups of frames near a current frame being viewed in the video editor, to enable frame accurate editing around the current frame being viewed, to single frame accuracy.

5. The method of claim 1, in which the video feed is a live video feed; or in which the video feed is a live sports video feed; or in which the video clip playback is real time video clip playback.

6. The method of claim 1, in which converting the video feed into the compressed format structure is performed in real time.

7. The method of claim 1, in which the code executable in the web browser is JavaScript code.

8. The method of claim 1,
   (i) including the step of executing the code in the web browser to provide the video clip playback corresponding to the video clip defined by the compressed format structure stored on the first server and the electronic edit decision list saved on the first server or on the second server; or
   (ii) including the step of the web browser code executing in the web browser to provide backwards play and forwards play at multiple speeds and at high displayed frame rate.

9. The method of claim 1, including the step of the web browser code executing in the web browser to create garbage while the web browser code is running which is insufficient to block program execution for long enough to cause skipped frames on playback.

10. The method of claim 1, in which the web browser code is executable in the web browser without configuration or installation.

11. The method of claim 1,
   (i) in which the video editor is arranged to request and to receive frames at the highest level of temporal resolution in the hierarchy, in the vicinity of a selected frame; or
   (ii) in which the video editor includes video/audio précis display hardware and/or software, which provides a visual summary of the video and/or audio, which summarises the content at multiple temporal scales and allows fast and convenient jog and/or shuttle navigation through an action.

12. The method of claim 1, in which the first server is a cloud server, or in which the second server is a cloud server.

13. The method of claim 1, including the step of the electronic edit decision list being generated even though the compressed format structure has not finished being stored on the first server.

14. The method of claim 1, including the step of the compressed format structure being stored on an ingest server, before the compressed format structure is uploaded to the first server.

15. The method of claim 14, in which the code is executable to download relevant video, audio, still, text and other files, including metadata files, from the first server or from the ingest server.

16. The method of claim 1, in which the code is executable to read and to interpret the electronic EDL; or in which the code is executable to combine files in the compressed format structure to play back the edited video at any of the spatial resolutions in the compressed format structure.

17. The method of claim 1, the method including an Edit step, in which a video editor system enables editing of video, audio, slides, titles and other media and metadata through the first server, to provide one or more electronic Edit Decision Lists.

18. The method of claim 1, the method including a Player view step, in which opening a browser or other software gives access to the edited videos by real time playback of the electronic EDLs saved in step (vi); or in which a Player, which runs entirely in JavaScript and has a relatively small footprint, is included in the web page code.

19. The method of claim 1, the method including being able to provide video clips in less than 60 seconds from an original recording made using a video camera.

20. The method of claim 1, the method including being able to provide video clips in less than 30 seconds from an original recording made using a video camera.

21. The method of claim 1, the method including providing the video clip playback on a mobile computing device, on a mobile phone, on a smartphone, on a tablet computer, on a smart watch, on a laptop computer, on a desktop computer, or on a smart TV.

22. The method of claim 1, in which the code is executable to provide live controls over some combination of video resolution, image size, playback speed, position through jog and/or shuttle, keyboard short cuts and other controls.

23. The method of claim 1, in which the compressed format structure includes loss free compression.

24. The method of claim 23, in which the loss free compression includes use of Transition Tables.

25. The method of claim 24, in which the code uses a video codec, wherein the video codec supports private keys to randomise the initial state of its Transition Tables, making each bitstream randomised.

26. The method of claim 25, in which a new player, incompatible with a previous player, is generated by providing new private keys.

27. The method of claim 1, in which an order in which video and audio of the compressed format structure is uploaded to the first server is determined by an upload ordering system.

28. The method of claim 27, including the steps of the upload ordering system
   (a) uploading non-uploaded compressed audio, where available, as the highest priority;
   (b) uploading non-uploaded coarsest temporal resolution video frames as the next highest priority;
   (c) uploading the non-uploaded next-coarsest temporal resolution video frames as the next highest priority;
   (d) uploading in this way until all video and audio frames have been uploaded.

29. The method of claim 1, in which Edit software, or player software, or another application, downloads video from the cloud, when it calculates that the video is needed.

30. The method of claim 1,
   (i) in which the method includes use of an Electronic EDL interpreter library hardware and/or software to enable electronic EDLs, and the sources they link to, to be converted into decompressed frames and audio samples, in real time for playback; or
   (ii) in which the method includes use of a Web-based video editor operable to create a cloud-hosted web page which can be accessed over a wide area network and which contains a video player which plays back the published video; or
   (iii) in which no time is required to upload an edited video to a renderer, or to a distribution network, because the video clip playback corresponds to a video clip defined by the compressed format structure and the electronic edit decision list, and because the video clip playback is provided using the web browser code.

31. The method of claim 1, in which the video is not required to be uploaded to a distribution network on publishing because it is (a) either already in the editor, uploaded during editing/publishing so it is already on the cloud or (b) a Player can call for frames from an ingest server before the frames are uploaded when the Player decides the frames will be needed during playback; this causes the frames to upload ahead of playback and then to be relayed via the ingest server to the Player.

32. A processing system including a processor and a first server, the system configured to provide video clip playback, wherein (i) the processor is configured to receive a video feed;
(ii) the processor is configured to convert the video feed into a compressed format structure, the compressed format structure including a hierarchy of more than two levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
(iii) the processor is configured to upload the compressed format structure to a first server;
(iv) the processor is configured to provide the compressed format structure in chunks to a video editor, wherein the video editor is operable to generate an electronic edit decision list (EDL), in which the video editor is operable to provide editing accurate to a single frame;
(v) the processor is configured to receive the electronic edit decision list from the video editor including editing accurate to a single frame, which defines how to manipulate the compressed format structure;
(vi) the processor is configured to save the electronic edit decision list to the first server, or to a second server wherein the system includes the second server;
(vii) the processor is configured to receive a request to provide in a web browser executing on a user terminal a video clip playback corresponding to a video clip defined by the compressed format structure and the electronic edit decision list;
(viii) the processor is configured to send to the web browser code executable in the web browser to provide the video clip playback corresponding to the video clip defined by the compressed format structure stored on the first server and the electronic edit decision list saved on the first server or on the second server, and
(ix) the processor is configured to respond to requests from the code when executing in the web browser, to provide content corresponding to the compressed format structure stored on the first server, in accordance with the electronic edit decision list saved on the first server or on the second server, to the web browser, to provide the video clip playback.

33. A processor, wherein
(i) the processor is configured to receive a video feed;
(ii) the processor is configured to convert the video feed into a compressed format structure, the compressed format structure including a hierarchy of more than two levels of temporal resolution of frames, each respective level of the hierarchy including frames corresponding to a respective temporal resolution of the respective level of the hierarchy, but not including frames which are included in one or more lower levels of lower temporal resolution of frames of the hierarchy;
(iii) the processor is configured to upload the compressed format structure to a first server;
(iv) the processor is configured to provide the compressed format structure in chunks to a video editor, wherein the video editor is operable to generate an electronic edit decision list (EDL), in which the video editor is operable to provide editing accurate to a single frame;
(v) the processor is configured to receive the electronic edit decision list from the video editor including editing accurate to a single frame, which defines how to manipulate the compressed format structure;
(vi) the processor is configured to save the electronic edit decision list to the first server or to a second server;

(vii) the processor is configured to receive a request to provide in a web browser executing on a user terminal a video clip playback corresponding to a video clip defined by the compressed format structure and the electronic edit decision list;

(viii) the processor is configured to send to the web browser code executable in the web browser to provide the video clip playback corresponding to the video clip defined by the compressed format structure stored on the first server and the electronic edit decision list saved on the first server or on the second server, and (ix) the processor is configured to respond to requests from the code when executing in the web browser, to provide content corresponding to the compressed format structure stored on the first server, in accordance with the electronic edit decision list saved on the first server or on the second server, to the web browser, to provide the video clip playback.

34. Computer code, the computer code embodied on a non-transitory storage medium, the computer code downloadable to a web browser executing on a user terminal and executable in the web browser to provide a video clip playback corresponding to a video clip defined by a compressed format structure stored on a first server and an electronic edit decision list (EDL) saved on the first server or on a second server, wherein the compressed format structure includes a hierarchy of more than two levels of temporal resolution of frames, each respective level of the hierarchy including frames corresponding to a respective temporal resolution of the respective level of the hierarchy, but not including frames which are included in one or more lower levels of lower temporal resolution of frames of the hierarchy, the computer code executable in the web browser to:

(i) request content corresponding to the compressed format structure stored on the first server, in accordance with the electronic edit decision list saved on the first server or on the second server, in which the electronic edit decision list includes editing accurate to a single frame, and (ii) provide the video clip playback.

\* \* \* \* \*